United States Patent
Ichinose et al.

(10) Patent No.: US 9,289,727 B2
(45) Date of Patent: Mar. 22, 2016

(54) PROCESS FOR FABRICATING MEMBRANE FILTERS, AND MEMBRANE FILTERS

(75) Inventors: Izumi Ichinose, Tsukuba (JP); Xinsheng Peng, Tsukaba (JP); Sandeep Ghosh, Tsukuba (JP); Qifeng Wang, Tsukuba (JP)

(73) Assignee: NATIONAL INSTITUTE FOR MATERIALS SCIENCE, Tsukuba-Shi, Ibaraki (JP)

( * ) Notice: Subject to any disclaimer, the term of this patent is extended or adjusted under 35 U.S.C. 154(b) by 1060 days.

(21) Appl. No.: 13/379,571

(22) PCT Filed: Aug. 4, 2010

(86) PCT No.: PCT/JP2010/063166
§ 371 (c)(1),
(2), (4) Date: Dec. 20, 2011

(87) PCT Pub. No.: WO2011/016478
PCT Pub. Date: Feb. 10, 2011

(65) Prior Publication Data
US 2012/0097603 A1    Apr. 26, 2012

(30) Foreign Application Priority Data

Aug. 4, 2009  (JP) ................................. 2009-181346
Jul. 5, 2010   (JP) ................................. 2010-152776

(51) Int. Cl.
*B01D 39/00*  (2006.01)
*B01D 39/14*  (2006.01)
(Continued)

(52) U.S. Cl.
CPC .............. *B01D 69/12* (2013.01); *B01D 67/003* (2013.01); *B01D 67/0011* (2013.01);
(Continued)

(58) Field of Classification Search
CPC ........ B01D 71/02; B01D 69/06; B01D 69/12; B01D 71/06; B01D 71/58; B01D 69/125

USPC ......... 210/500.25, 500.27, 702, 651, 500.21, 210/490; 524/17; 977/840, 890, 705; 264/41

See application file for complete search history.

(56) References Cited

U.S. PATENT DOCUMENTS 8,741,152 B2 *   6/2014   Peng et al. .................... 210/702
2004/0049230 A1 * 3/2004  Montemagno et al. ........... 607/1
(Continued)

FOREIGN PATENT DOCUMENTS

EP    2168669 A1 *  3/2010
EP    2179779 A2 *  4/2010
(Continued)

OTHER PUBLICATIONS

Europe Patent Office, "Search Report for EP 10806477.5," Oct. 2, 2015.
Peng, X. et al., "Ultrafast permeation of water through protein-based membranes," Nature Nanotechnology, 2009, p. 353-357, vol. 4, No. 6, Macmillan Publishers Limited.
Peng, X. et al., "Mesoporous Separation Membranes of Polymer-Coated Copper Hydroxide Nanostrands," Advanced Functional Materials, 2007, p. 1849-1855, vol. 17, No. 11, Wiley-VCH Verlag GmbH & Co. KGaA, Weinheim, Germany.

*Primary Examiner* — Ana Fortuna
(74) *Attorney, Agent, or Firm* — Manabu Kanesaka

(57) ABSTRACT

The invention provides a process for fabricating a membrane filter that can stand up to filtration of nanometer-scaled fine particles or organic molecules, and a membrane filter having that filtration feature.

Membrane filter 20 is disclosed. There is also the process for fabricating membrane filter 20 disclosed that is characterized by comprising the steps of mixing an aqueous solution containing a metal salt and an aqueous solution containing an alkali to prepare nanostrand solution 32 comprising a metal hydroxide, and filtrating nanostrand solution 32 through porous substrate 2 having pores to fabricate nanostrand sheet 3 comprising an accumulation of fibrous nanostrands on porous substrate 2 wherein the first pore formed between the nanostrands and extending through the nanostrand sheet from one surface side to another surface side has a maximum diameter of up to 5 nm.

17 Claims, 18 Drawing Sheets

(51) Int. Cl.
 B01D 69/12 (2006.01)
 B01D 71/02 (2006.01)
 B01D 71/06 (2006.01)
 B01D 67/00 (2006.01)
 B01D 69/02 (2006.01)
 B01D 71/08 (2006.01)
 B01D 71/28 (2006.01)
 B01D 71/60 (2006.01)

(52) U.S. Cl.
 CPC .......... B01D 67/0079 (2013.01); B01D 69/02 (2013.01); B01D 71/02 (2013.01); B01D 71/06 (2013.01); B01D 71/08 (2013.01); B01D 71/28 (2013.01); B01D 71/60 (2013.01); B01D 2323/30 (2013.01); B01D 2325/02 (2013.01); B01D 2325/04 (2013.01)

(56) References Cited

U.S. PATENT DOCUMENTS

| | | | |
|---|---|---|---|
| 2004/0242714 A1* | 12/2004 | Penezina et al. | 521/50 |
| 2010/0140163 A1* | 6/2010 | Peng et al. | 210/496 |
| 2012/0055877 A1* | 3/2012 | Ichinose et al. | 210/651 |
| 2012/0097603 A1* | 4/2012 | Ichinose et al. | 210/500.21 |

FOREIGN PATENT DOCUMENTS

| | | |
|---|---|---|
| JP | H05-293316 | 11/1993 |
| JP | H08-010764 | 1/1996 |
| JP | 2006-000929 | 1/2006 |
| JP | WO2007/037315 | 4/2007 |

* cited by examiner

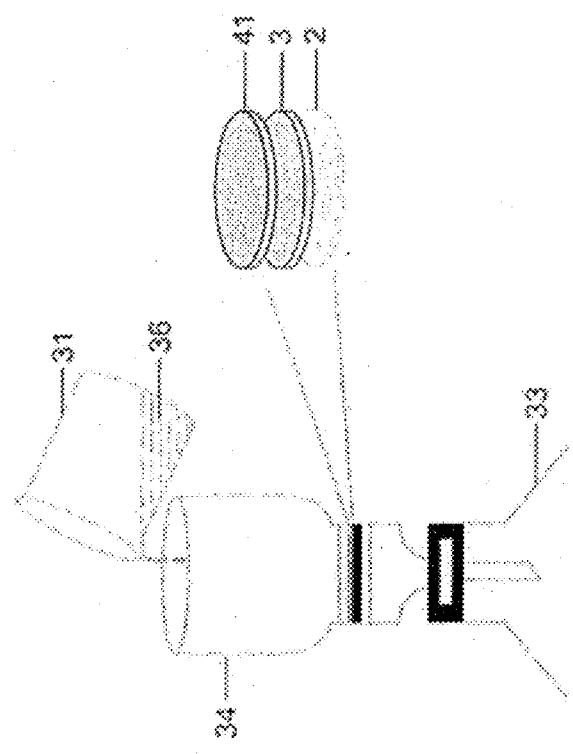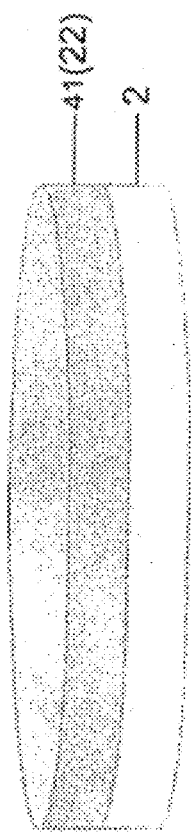

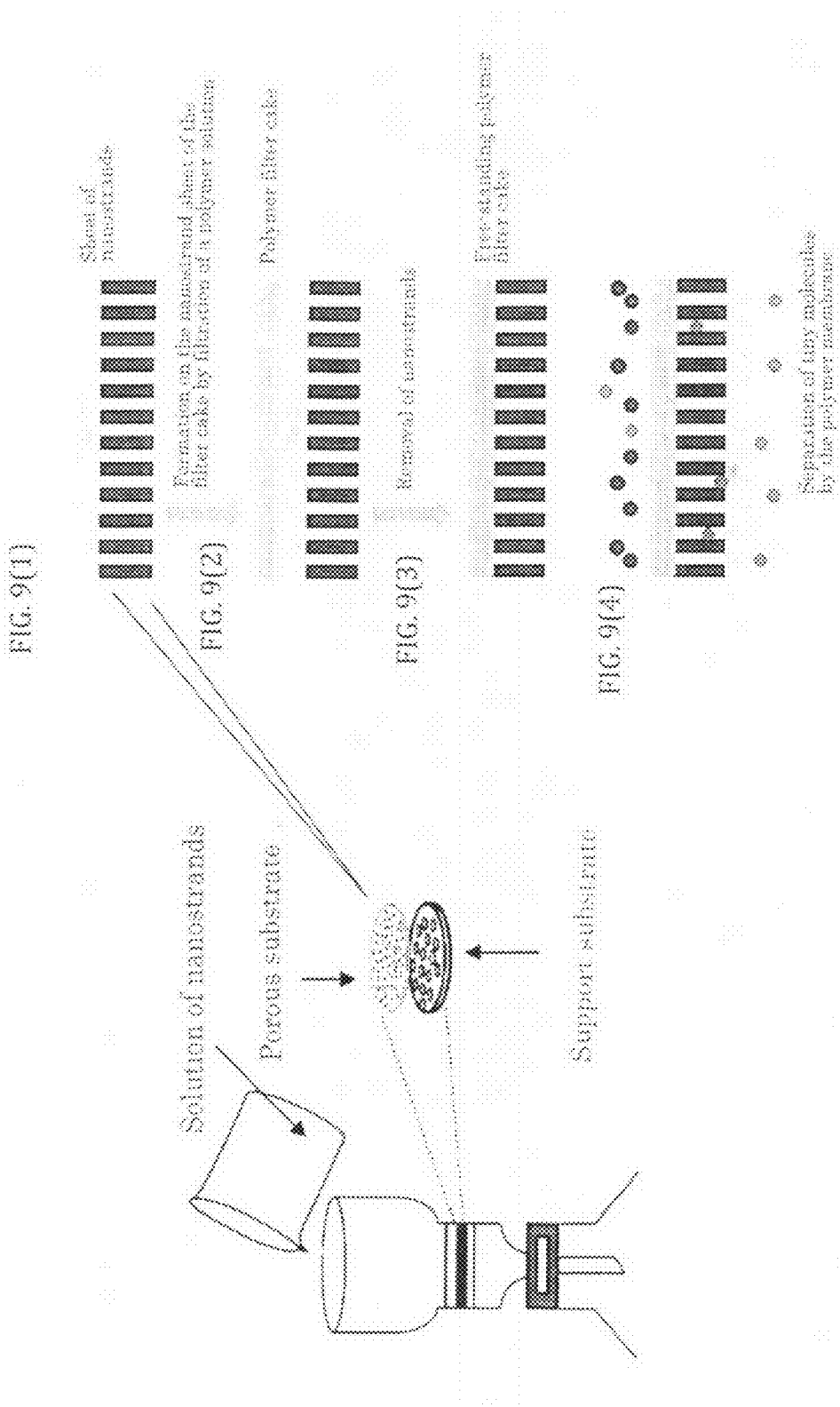

FIG. 10(a)
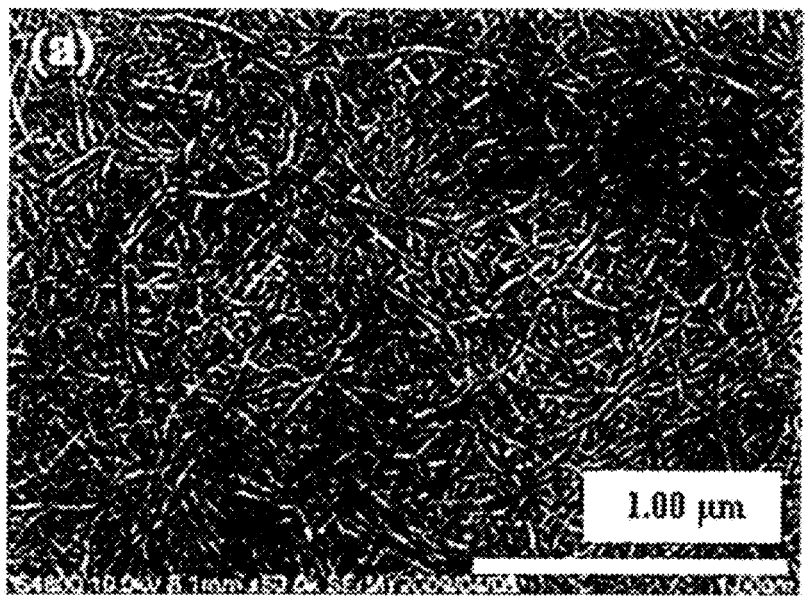
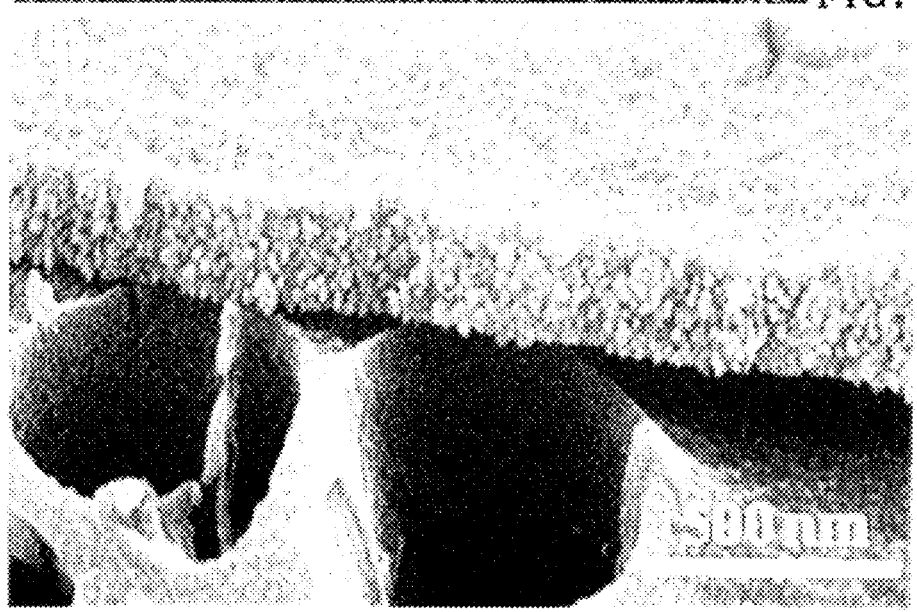
FIG. 10(b)

PROCESS FOR FABRICATING MEMBRANE FILTERS, AND MEMBRANE FILTERS

RELATED APPLICATIONS

The present application is National Phase of International Application No. PCT/JP2010/063166 filed Aug. 4, 2010, and claims priority from Japanese Applications No. 2009-181346, filed Aug. 4, 2009; and No. 2010-152776, filed Jul. 5, 2010.

BACKGROUND OF THE INVENTION

1. Field of the Invention

The present invention relates generally to a process for fabricating membrane filters and a membrane filter, and more particularly to a process for fabricating a porous membrane using a nanostrand sheet and a membrane filter comprising that porous membrane.

2. Description of the Prior Art

Membrane filters are frequently used in a variety of applications where there are the needs for filtration and separation such as air cleaning, and solid-liquid separation.

In particular, membrane filters capable of separating nanometer-scaled fine particles and organic molecules find wide applications to the production of drinking water and industrial water, sewage purification, the manufacturing of foodstuffs and chemicals, medical purification membranes, etc.

Ultrathin membrane filters are now expected to achieve fast permeation of liquids, and there is a great likelihood that the treatment time taken for separation will be much curtailed. They also lead to much savings of the energy necessary for separation, and there is every reason to expect that they will provide separation membranes in association with the next-generation energy creation.

So far, several methods have been known for the fabrication of membrane filters.

Reverse osmosis membranes capable of removing organic molecules and dissolved ions are generally obtainable by making use of the polycondensation of monomers at a liquid/liquid interface. This method provides a large-area polymer membrane having a thickness of a few tens of nanometers, which is widely used as a water treating membrane.

However, pores inside the polymer membrane are as small as the rate of permeation of liquids is too slow, resulting in the need for high pressure for the permeation of liquids.

With the phase transition of a polymer solution, there are membrane filters obtained that are capable of separating fine particles or organic molecules of up to 200 nm in diameter. These filters, called ultrafilter membranes, are used in a wide range of applications.

However, the ultrafilter membranes have generally a thickness of greater than a few tens of micrometers; hence, the rate of filtration is very slow.

In recent years, for this reason, studies of membrane filters having fast filtration and high energy efficiency have been made extensively and intensively.

Referring typically to the "alternate adsorption method" wherein positively and negatively charged polymer electrolytes are alternately adsorbed onto a solid substrate, there is a polymer membrane obtained with its thickness controlled on a nanometer scale, and its application to membrane filters is now under study.

Spin coating makes it possible to form polymer membranes of the order of 10 nm, which are not only used as resists for semiconductor fabrication but are also studied as to whether or not they may be used as ultra-thin separating membranes.

However, those methods have difficulty in continuous fabrication of nanometer-scaled, large-area membranes; they are still not established as an industrial fabrication process for membrane filters.

For the fabrication of nanofibrous membrane filters, electrospinning now attracts attention.

With this technique, there are membrane filters obtained that comprise nanofibers of a few tens of nanometers in width, but pores formed in inter-nanofiber gaps are larger than the width of each nanofiber, rendering it difficult to fabricate a membrane filter having a pore diameter of up to 10 nm.

A recent report by Wu et al. shows that a dispersion of single wall carbon nanotubes in water is filtrated so that a nanofibrous free-standing film can be produced (Non-Patent Publication 1).

The nanotube used by them is partially oxidized on its surface so that it can be dispersed in water using a surface active agent. As the dispersion is filtrated through a cellulosic filter, then fully washed, and then immersed in acetone for dissolution of the filter, it yields a transparent, electrically conductive nanofibrous free-standing film of 80 nm in thickness and 10 cm in diameter.

The method proposed by Wu et al. is regarded as a fabrication process for membrane filters by relying upon the "filtration" of a nanofibrous substance dispersion. This method provides a simple, very efficient process for fabricating large-area membrane filters, as is the case with "papermaking", and would enable the thickness of membrane filters to be controlled by the concentration and amount of the dispersion used as well.

For the fabrication of membrane filters by the "filtration", however, the nanofibrous substance must have a high aspect ratio.

For the fabrication of an ultrathin membrane filter having a pore diameter of up to 10 nm, ultrafine nanofibers are inevitable, and there is the need for those nanofibers to be dispersed uniformly in a solvent.

In addition, the nanofibers must be rigid and structurally stable against suction filtration.

Never until is such a substance as satisfying these conditions found except single wall carbon nanotubes.

For the nanofibers capable of being used with the filtration method, the inventors have focused on independently developed metal hydroxide nanostrands.

The nanostrand has a diameter of up to 2.5 nm, and has strongly positive charges on its surface so that it is present while dispersed in water. For this reason, it can be formed by filtration into a sheet configuration as is the case with an ultrafine carbon nanotube.

Still, the nanostrand sheet, because of being formed of a metal hydroxide, has a demerit of being easily dissolved in an acidic aqueous solution; so it has been expected to be hardly applied to membrane filters.

To solve the aforesaid problem, we have coated an electrically conductive polymer around individual nanostrands in water to prepare a composite fiber improved in terms of chemical stability. We have also prepared an ultrafilter membrane having a thickness of a few tens of nanometers by filtration of such composite fibers (Non-Patent Publication 2).

Moreover, we have revealed that nanostrands and a water-soluble substance (proteins or anionic nanoparticles, dyes, fullerene, nanotubes (hereinafter called the proteins or the like") are mixed together in water to prepare a composite fiber so that various free-standing films or membranes can be fabricated by the filtration of that composite fiber (Non-Patent Publication 3).

In particular, it has been shown that the free-standing membrane formed by the filtration of the composite fibers of nanostrands and protein provides an effective ultrafilter membrane for fast filtration of organic molecules (Non-Patent Publication 4), and it has also been confirmed that as the free-standing membrane is used to make a deposition of filter cakes of a polymer such as a dendrimer and the filter cakes are crosslinked with a difunctional crosslinking, it can yield free-standing membrane of a thin double-layer structure (Patent Publication 1).

Thus, the composite fiber prepared from nanostrands and the proteins or the like yields an ultrathin free-standing membrane by means of filtration.

For this method, however, there was the need for designing interactions between the nanostrands and the protein or the like.

For instance, the nanostrand has a lot of positive charges on its surface; so it could form a composite fiber with a dye molecule having multiple negative charges, but it had difficulty forming a composite fiber with a dye molecule having a neutral or positive charge.

When the electrically conductive polymer was coated around the nanostrand, too, there was the need for addition of an additive such as polystyrene sulfonate so as to bring about electrostatic interactions with the nanostrand. In addition, the electrically conductive polymer to be coated was limited to polypyrrole or polyaniline alone.

Moreover, there were a lot of charges on the surface of the composite fiber coated with the electrically conductive polymer and the proteins or the like, because it had to have been dispersible in water, ending up with a problem of easily absorbing a substance having opposite charges.

LISTING OF THE PRIOR ARTS

Patent Publication: JP(A) 2009-131725
Non-Patent Publication 1:
Wu, et al., Science, Vol. 305, pp. 1273-1276, 2004 "Transparent conductive carbon nanotube films"
Non-Patent Publication 2:
Peng, et al., Advanced Functional Materials, Vol. 17, pp. 1849-1855, 2007 "Mesoporous Separation Membranes of Polymer-Coated Copper Hydroxide Nanostrands"
Non-Patent Publication 3:
Peng, et al., Journal of the American Chemical Society, Vol. 129, pp. 8625-8633, 2007 "General Method for Ultrathin Free-Standing Films of Nanofibrous Composite Materials"
Non-Patent Publication 4:
Peng, et al., Nature Nanotechnology, Vol. 6, pp. 353-357, 2009 "Ultrafast Permeation of Water through Protein-Based Membranes"
Non-Patent Publication 5:
Zohrevand, et al., Polymer International, Vol. 54, pp. 744-753, 2005 "2-Naphthol-containing β-cyclodextrin-epichlorohydrin copolymers: synthesis, characterization and fluorescence studies" (see paragraph [0101])
Non-Patent Publication 6:
Luo, et al., Chemistry of Materials, Vol. 18, pp. 1795-1802, 2006 "Formation of positively charged copper hydroxide nanostrands and their structural characterization" (see Paragraph [0104])

Non-Patent Publication 7:
Peng, et al., Chemical Communications, Vol. 2008, pp. 1904-1907, 2008 "Time-dependent growth of zinc hydroxide nanostrands and their crystal structure" (see Paragraph [0104])

SUMMARY OF THE INVENTION

Object of the Invention

The situations being like this, the invention has for its object to provide a membrane filter that can stand up to filtration of nanometer-scaled fine particles or organic molecules. A specific object of the invention is to provide a process for fabricating a membrane filter without providing a coating around nanostrands, and an ultrathin, large-area membrane filter.

Means for Accomplishing the Object

According to the first aspect of the invention, there is a process for fabricating membrane filters provided, characterized by comprising steps of:

mixing an aqueous solution containing a metal salt and an aqueous solution containing an alkali to prepare a nanostrand solution comprising a metal hydroxide, and filtrating the nanostrand solution through a porous substrate to make an accumulation of fibrous nanostrands on the porous substrate thereby fabricating a nanostrand sheet wherein the maximum diameter of a first pore formed between the nanostrands and extending through the sheet from one surface side to another surface side is set at up to 5 nm.

In one embodiment of the first aspect of the invention, it is preferable that the metal hydroxide is any one of $Cd(OH)_2$, $Cu(OH)_2$ or $Zn(OH)_2$, and that pores in the porous substrate have a maximum diameter of up to 1.0 μm.

In one embodiment of the first aspect of the invention, there is a process for fabricating membrane filters provided, which further includes a step wherein a solution containing organic molecules is filtrated through the nanostrand sheet to form a filter cake comprising an accumulation of the organic molecules on the nanostrand sheet.

In one embodiment of the first aspect of the invention, there is a process included, in which a solution containing organic molecules separate from the organic molecule forming the first-mentioned filter cake is filtrated through the nanostrand sheet having the first-mentioned filter cake formed thereon to form another filter cake comprising an accumulation of the second-mentioned organic molecules on the first-mentioned filter cake.

In one embodiment of the first aspect of the invention, an acid solution may be passed through the nanostrand sheet having the filter cake formed thereon for removal of the nanostrands.

In one embodiment of the first aspect of the invention, any one of β-cyclodextrin, polyethylene-imine or poly(4-vinylpyridine) may be used as the organic molecules.

In one embodiment of the first aspect of the invention, there is a process included, in which crosslinking treatment is carried out after the formation of the filter cake.

According to the second aspect of the invention, there is a membrane filter provided, which comprises a nanostrand sheet made up of an accumulation of nanostrands composed of a fibrous metal hydroxide, and is characterized in that the maximum diameter of a first pore formed through the nanostrand sheet and extending through the nanostrand sheet from one surface side to another surface side is set at up to 5 nm.

In one embodiment of the second aspect of the invention, it is preferable that the metal hydroxide is any one of $Cd(OH)_2$, $Cu(OH)_2$ or $Zn(OH)_2$, and that the maximum diameter of the nanostrand is up to 2.5 nm.

In one embodiment of the second aspect of the invention, it is preferable that the nanostrand sheet has a thickness of up to 200 nm.

In one embodiment of the second aspect of the invention, there is a membrane filter included, in which there is a filter cake formed in which organic molecules are accumulated (built or piled) up on one side of the nanostrand sheet. More specifically, there is a membrane filter included, in which the maximum diameter of a second pore provided through the filter cake and extending through the filter cake from one surface side to the other surface side is up to 5 nm.

In one embodiment of the second aspect of the invention, there is a membrane filter included, in which two or more filter cakes has a laminated or stacked structure. More specifically, there is a membrane filter included, in which there is a separate filter cake formed, in which separate organic molecule are accumulated up on the first-mentioned filter cake having the first-mentioned organic molecules accumulated thereon.

In one embodiment of the second aspect of the invention, the organic molecules may be any one of β-cyclodextrin, polyethylene-imine or poly(4-vinylpyridine), which may or may not be crosslinked.

In one embodiment of the second aspect of the invention, either one of the first-mentioned and second-mentioned filter cakes may include β-cyclodextrin that is crosslinked with epichlorohydrin.

In one embodiment of the second aspect of the invention, either one of the first-mentioned and second-mentioned filter cakes may include poly(4-vinylpyridine that is cross linked with glutaraldehyde.

In one embodiment of the second aspect of the invention, the membrane filter is further characterized in that the nanostrands are removed from the nanostrand sheet having the first-mentioned filter cake formed thereon. This embodiment may also include a porous substrate stacked on another side of the nanostrand sheet or the first-mentioned filter cake, said substrate having pores having a maximum diameter of up to 1.0 μm.

Advantages of the Invention

Nanostrands comprising a metal hydroxide are not only comparable in terms of fineness and aspect ratios to carbon nanotubes but are also obtainable more easily and more reliably than could be achieved with conventional carbon nanotube synthesis processes. From these facts, their use has been under consideration.

The nanostrands, because of being vulnerable to acids, have limited use, because they are considered difficult-to-use unless they are subjected to resistance-to-acid treatment. In view of their possibility of being used as filters if a feed solution used for filtration operation is not acidic, the inventors have carried out experimentation and confirmed that they can, and arrived at the invention disclosed herein.

Consequently, it has been found that if nanostrands are filtrated through a properly selected porous substrate, it is then possible to form a paper-like porous sheet (nanostrand sheet) that can stand up to filtration of nanometer-scaled fine particles or polymers: with that nanostrand sheet, it is possible to remove proteins, nanoparticles, polymers or the like dispersed in a solution at high speed, all having a width of 3 nm or greater.

The "polymers or the like" used herein is understood to include dendrimers, branched polymers or oligomers having a width of 3 nm or greater, and include macromolecules of 3 nm or greater in width, crosslinked organic molecules and molecular assemblies of 3 nm or greater in width as well. Even straight-chain polymers such as polyvinyl alcohols are included in the "polymers or the like" provided that they can form a structure having a polymer chain of 3 nm or greater through inter-(intra-) molecular interactions. Moreover, even small organic molecules can be removed by the nanostrand sheet provided that they can form a crosslinked structure having a width of 3 nm or greater. In the present disclosure, proteins, nanoparticles, polymers or the like may generally be called the "organic molecules", but every substance having a width of 3 nm or greater could be removed by the nanostrand sheet irrespective of its type.

By filtration of the organic molecules using the nanostrand sheet, that is, by use of a process similar to papermaking, it is possible to form ultrathin porous membranes (filter cakes), and by the formation of those filter cakes, a membrane filter capable of blocking smaller organic molecules could be fabricated as well.

Further, if the nanostrands are removed by acid treatment after the formation of the filter cake, it would then be possible to open the way for the application of the membrane filter to where dissolution of metal ions such as cadmium ions offers a problem.

The invention also allows distinct filter cakes to be laminated or stacked one upon another using the nanostrand sheet. In turn, this would allow for the fabrication of a membrane filter having a combination of multiple properties such as block capability, surface affinity, and dynamic strength.

The inventive process for fabricating a membrane filter comprises the step of mixing a metal salt-containing aqueous solution with an alkali-containing aqueous solution to prepare a nanostrand solution comprising a metal hydroxide, and the step of filtrating the nanostrand solution through a porous substrate to accumulate or build fibrous nanostrands up on the porous substrate thereby fabricating a nanostrand sheet wherein the maximum diameter of a first pore formed between nanostrands and extending through the nanostrand sheet from one surface side to another surface side is set at up to 5 nm: it is possible to fabricate a membrane filter readily and reliably, which filter has a lot of fine pores, makes sure fast permeation of solutions, and has a smooth surface. Such nanostrands, because of being vulnerable to acids, have been considered difficult-to-use unless subjected to resistance-to-acids treatment; however, they can be used as filters unless the feed solution for filtration operation is acidic. In other words, if the nanostrand solution is filtrated through a properly selected porous substrate, it is then possible to form a paper-like porous sheet (nanostrand sheet) that can stand up to filtration of nanometer-scaled fine particles, proteins, polymers or the like. The nano-strand sheet may be downscaled to an ultrathin level of 20 nm, and even so, it is dynamically robust enough to be used as a membrane filter with the application of a pressure difference of 100 kPa to it.

The inventive membrane filter is formed of a nano-strand sheet comprising an accumulation of nanostrands made up of a fibrous metal hydroxide, and has a structure in which the maximum diameter of the first pore formed through the nanostrand sheet and extending from one surface side to another surface side is set at up to 5 nm. By proper selection of the thickness of the nanostrand sheet, it is then possible to obtain a membrane filter capable of fast removal of polymers, proteins or nanoparticles having a width of 3 nm or more, polymers or the like, all dispersed in a solution.

BRIEF DESCRIPTION OF THE DRAWINGS

FIG. 1(a) is an illustration of the step of preparing a nano-strand solution, FIG. 1(b) is an illustration of the filtration step, and FIG. 1(c) is an enlarged perspective view of a substrate after filtration.

FIG. 2(a) is a perspective view of that filter, FIG. 2(b) is an enlarged plan view of a spot A in FIG. 2(a), and FIG. 2(c) is a sectional view of FIG. 2(b) as taken along B-B' line.

FIG. 3(a) is an illustration of the step of preparing an organic molecule-containing solution, FIG. 3(b) is an illustration of the filtration step, and FIG. 3(c) is an enlarged perspective view of a substrate after filtration.

FIG. 4(a) is a perspective view of that filter, FIG. 4(b) is an enlarged plan view of a spot C in FIG. 4(a), and FIG. 4(c) is a sectional view of FIG. 4(b) as taken along D-D' line.

FIGS. 5(a) and 5(b) are illustrations of yet another example of the inventive process for fabricating membrane filters: FIG. 5(a) is an illustration of the filtration step using an acid solution, and FIG. 5(b) is an enlarged perspective view of a substrate after filtration.

FIG. 7(a) is an illustration of the filtration step using a second organic molecule-containing solution, and FIG. 7(b) is an enlarged perspective view of a substrate after filtration.

FIG. 8(a) is a perspective view of that filter, and FIG. 8(b) is a longitudinally sectioned view of FIG. 8(a).

FIGS. 9(1), 9(2), 9(3), and 9(4) are illustrations in schematic of filtration through a nanostrand sheet: FIG. 9(1) is an illustration of a nanostrand sheet on a porous substrate, FIG. 9(2) is an illustration of how to form a polymer filter cake using a nanostrand sheet, FIG. 9(3) is an illustration of nanostrand removal, and FIG. 9(4) is an illustration of substance separation by a filter cake (a polymer membrane).

FIGS. 10(a) and 10(b) are a set of SEM images of a nanostrand sheet on an anodized porous alumina membrane: FIG. 10(a) is an SEM image of the surface of that sheet, and FIG. 10(b) is in SEM image of a section of that sheet.

EMBODIMENTS FOR CARRYING OUT THE INVENTION

First Embodiment of the Invention

The process for fabricating membrane filters and the membrane filter according to the first embodiment of the invention are now explained with reference to the accompanying drawings.

Figure 1A:
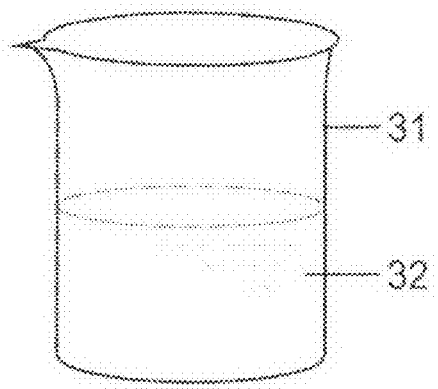
FIGS. 1(a), 1(b), and 1(c) are illustrations of one example of the inventive process for fabricating membrane filters.
Figure 1B:
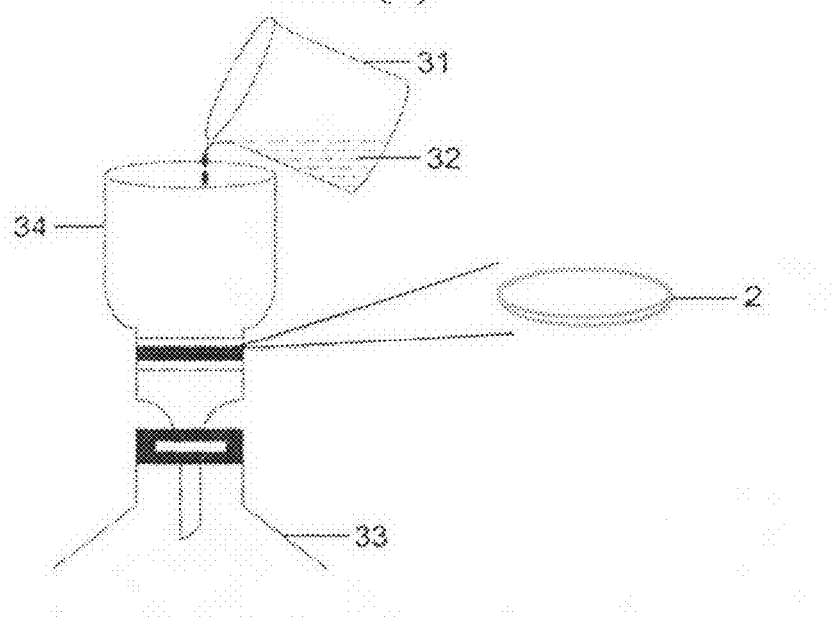
Figure 1C:
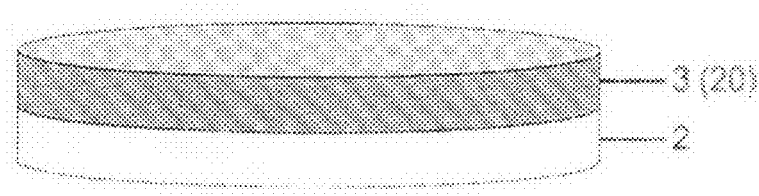

FIGS. 1(a), 1(b), and 1(c) are illustrations of one example of the inventive process for fabricating membrane filters that is one particular embodiment of the invention: FIG. 1(a) is an illustration of the step of preparing a nanostrand solution, FIG. 1(b) is an illustration of the filtration step, and FIG. 1(c) is an enlarged perspective view of a substrate after filtration.

The inventive process for fabricating membrane filters according to one particular embodiment of the invention generally comprises the step of preparing a nanostrand solution, and the step of filtrating the nanostrand solution to fabricate a membrane filter comprising a nanostrand sheet.

In the step of preparing a nanostrand solution, a metal salt-containing aqueous solution and an alkali-containing aqueous solution are mixed together to prepare a nanostrand solution comprising a metal hydroxide.

First of all, a nanostrand solution 32 comprising a metal hydroxide is prepared in a beaker 31, as shown in FIG. 1(a).

The metal hydroxide should preferably be formed under pH conditions at or near neutrality: for instance, it is preferably any one of $Cd(OH)_2$, $Cu(OH)_2$, or $Zn(OH)_2$.

For the nanostrand solution 32, it is preferable to use the aqueous solution used for nanostrand preparation, and there is the mention of, for instance, an aqueous solution of cadmium hydroxide nanostrands.

Then, a funnel 34 with a porous substrate 2 inserted into it is attached to a suction bin 33, and the nanostrand solution 32 is poured down the funnel 34 as shown in FIG. 1(b) for filtration through the substrate 2.

By virtue of filtration, a nanostrand sheet 3 is formed on the porous substrate 2, as shown in FIG. 1(c). It is this nanostrand sheet 3 that provides a membrane filter 20 that is one particular embodiment of the invention.

Any desired substrate may be used for the porous substrate 2 provided that it has a pore size enough to block nanostrands but permit the rest of the solution to permeate, and a substrate having a pore diameter of up to 1.0 μm is preferred. For instance, there is the mention of a polycarbonate membrane filter, and an anodized porous alumina filter, each having submicronmeter-sized pores. Also, the porous substrate should preferably a surface opening area (aperture area rate) of 10% or greater because the filtration time can then be curtailed.

Some nanostrands have a length as long as a few tens of micrometers; with a porous substrate having pores of up to 10 μm, the inventive membrane filter 20 might somehow be formed. In this case, however, most of nanostrands will pass through the porous substrate, resulting in the need for using a great amount of the nanostrand solution to form the membrane filter 20.

It is here to be noted that another porous substrate having a distinct pore diameter may be stacked on the porous substrate 2. This in turn permits the porous substrate assembly to gain strength, making sure stable filtration.

Figure 2A:
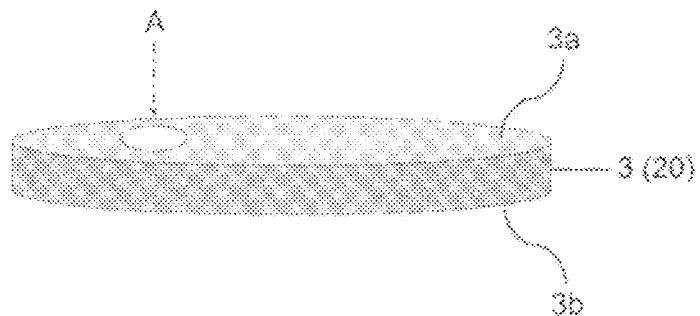
FIGS. 2(a), 2(b), and 2(c) are illustrations of one example of the inventive membrane filter.
Figure 2B:
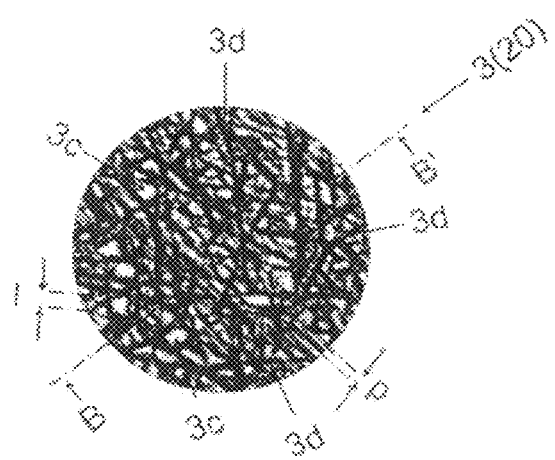
Figure 2C:
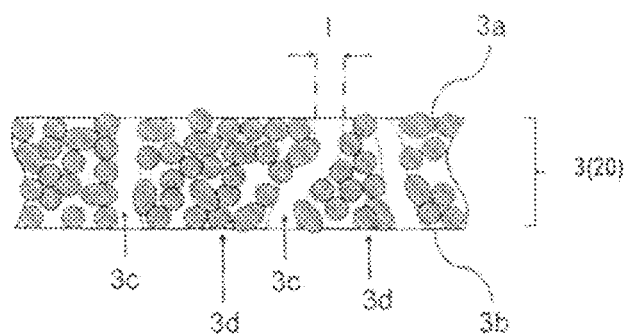

FIGS. 2(a), 2(b), and 2(c) are illustrations of one example of the inventive membrane filter that is one particular embodiment of the invention: FIG. 2(a) is a perspective view of that filter, FIG. 2(b) is an enlarged plan view of a spot A in FIG. 2(a), and FIG. 2(c) is a sectional view of FIG. 2(b) as taken along B-B' line.

As shown in FIG. 2(a), the membrane filter 20 that is one particular embodiment of the invention is a substantially round disc form of nanostrand sheet 3.

As shown in FIG. 2(b), the nanostrand sheet 3 comprises an accumulation of fibrous nanostrands 3d formed of the metal hydroxide.

As shown in FIG. 2(c), there is a first pore 3c provided through the nanostrand sheet 3 in such a way as to communicate one surface side 3a with another surface side 3b. The maximum diameter 1 of the first pore 3c (more specifically, a narrow portion of a path taken by the first pore 3c, at which narrow portion proteins, nanoparticles, polymers or the like are blocked) is set at up to 5 nm. As the thickness of the nanostrand sheet is greater than 100 nm, the size of that maximum diameter 1 becomes about 3 nm. This allows for filtration of proteins or the like having a size of greater than 3 nm. Depending on the degree of accumulation of the nanostrands 3d, the first pore 3c occurs by way of gaps of various sizes between the nanostrands 3d.

Each or the nanostrand 3d should preferably have a diameter of up to 2.5 nm whereby the diameter 1 of the first pore 3c formed between the nanostrands 3d can easily be set at up to 3 nm.

The nanostrand 3d should preferably be formed of a metal hydroxide: it should preferably be any one of $Cd(OH)_2$, $Cu(OH)_2$ or $Zn(OH)_2$. For instance, the nano-strand is formed of $Cd(OH)_2$ having a diameter of 1.9 nm.

The nanostrands sheet should have a thickness of preferably 20 nm to 400 nm inclusive, more preferably 50 nm to 200 nm inclusive. It is here to be noted that if the sheet thickness is set at up to 20 nm, fast separation of nanoparticles or the like may be achievable, but there is a pore formed with a pore diameter of greater than 5 nm.

Second Embodiment of the Invention

Figure 3A:
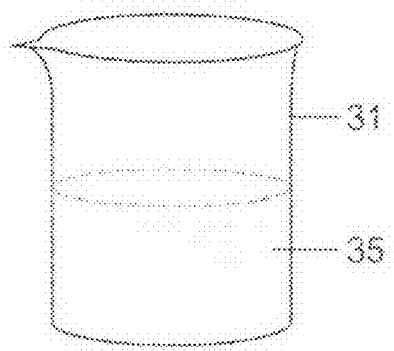
FIGS. 3(a), 3(b), and 3(c) are illustrations of another example of the inventive process for fabricating membrane filters.
Figure 3B:
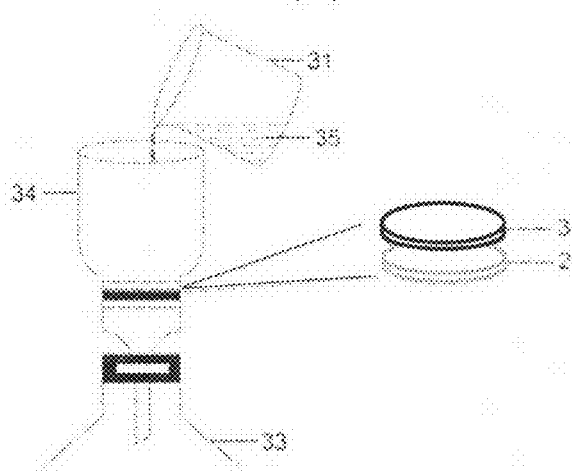
Figure 3C:
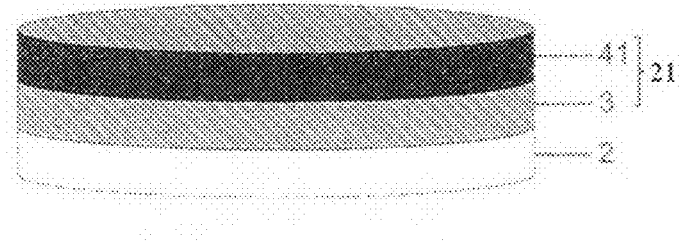

FIGS. 3(a), 3(b), and 3(c) are illustrations of another example of the inventive process for fabricating membrane filters: FIG. 3(a) is an illustration of the step of preparing an organic molecule-containing solution, FIG. 3(b) is an illustration of the filtration step, and FIG. 3(c) is an enlargedperspective view of a substrate after filtration.

First of all, an organic molecule-containing solution 35 is prepared in a beaker 31, as shown in FIG. 3(a).

Preferable for the organic molecule-containing solution 35 is a uniform dispersion of organic molecules having a molecular size of 3 nm or greater in a solution; for instance, there is the mention of a polymer solution having β-cyclodextrin crosslinked with epichlorohydrin.

Then, a funnel 34 with a porous substrate 2 inserted into it is attached to a suction bin 33, and the organic molecule-containing solution 35 is poured down the funnel 34 for filtration, as shown in FIG. 3(b).

By virtue of filtration, a filter cake 41 made up of organic molecules is formed on a nanostrand sheet 3 formed on the porous substrate 2, as shown in FIG. 3(c). It is a double-layered structure made up of the nano-strand sheet 3 and the filter cake 41 that provides a membrane filter 21 that is the second embodiment of the invention.

Figure 4A:
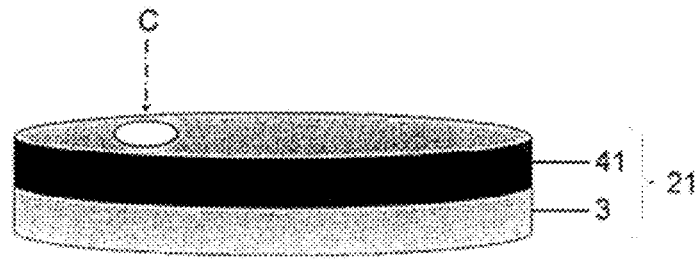
FIGS. 4(a), 4(b), and 4(c) are illustrations of another example of the inventive membrane filter.
Figure 4B:
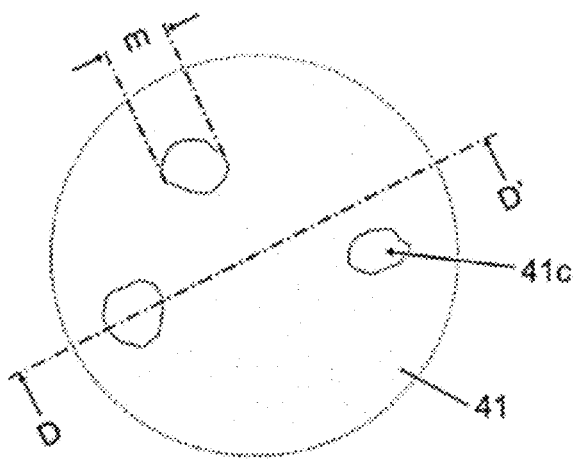
Figure 4C:
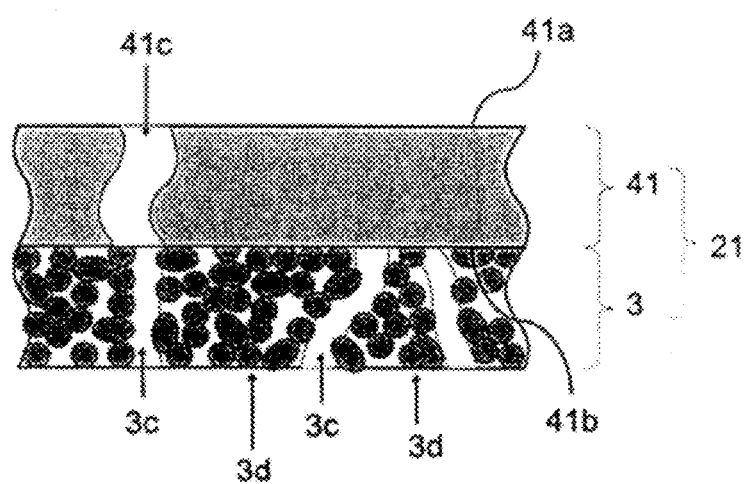

FIGS. 4(a), 4(b), and 4(c) are illustrations of another example of the inventive membrane filter that is the second embodiment of the invention: FIG. 4(a) is a perspective view of that filter, FIG. 4(b) is an enlarged plan view of a spot C in FIG. 4(a), and FIG. 4(c) is a sectional view of FIG. 4(b) as taken along D-D' line.

As shown in FIGS. 4(a), 4(b), and 4(c), the membrane filter 21 that is one particular embodiment of the invention is a double-layered structure made up of a nanostrand sheet 3 and a filter cake 41. There is also a second pore 41c provided in such a way as to communicate one surface side 41a of the filter cake 41 with another surface side 41b. The maximum diameter m of the second pore 41c is set at up to 5 nm.

There is no general explanation of how the second pore 41c through the filter cake 41 is formed, because the mechanism involved varies with the organic molecules to be filtrated. In the case of filtration of spherical proteins or nanoparticles, however, the second pore 41c would occur by way of voids formed between proteins or nanoparticles, and in the case of filtration of crosslinked polymers, the second pore 42c would occur by way of gaps formed in a network structure created by polymer chains. In the case of filtration of a polymer obtained by crosslinking cyclic molecules such as cyclodextrin, the second pore 41c would occur by way of both pores in the cyclic molecules and the gaps in the network structure of cyclic molecules.

The filter cake 41 is a membrane comprising an accumulation of organic molecules and, at the same time, an ultrathin porous membrane. The filter cake 41 according to the invention is used as a membrane filter, and there is the second pore 41c formed through it; so it must have dynamic stability enough to be used as a membrane filter. In addition, when the filter cake is in contact with a solvent, it may not possibly be dissolved out in a solvent. For this reason, there must be interactions such as hydrophobic interaction, electrostatic interaction, hydrogen bond and covalent bond working between the organic molecules in the filter cake.

When the filter cake is used as a membrane filter with high pressure applied to it, the organic molecules are polymers that are preferably crosslinked with a crosslinking agent or the like. How to achieve this crosslinking includes addition of a crosslinking agent to the solution 35 containing the organic molecules. Alternatively, a filter cake may be formed out of the solution 35 containing no crosslinking agent, after which the filter cake is brought in contact with a crosslinking agent. Crosslinking is not necessarily limited to the use of crosslinking agents; it may be achieved by physical means such as heat treatment, irradiation with light or the like.

For simple prevention of the filter cake from being dissolved out in a solvent, on the other hand, there is only the need for designing hydrophobic interaction, electrostatic interaction and hydrogen bond between the organic molecules.

The filter cake 41 may be a membrane made up of a crosslinked form of oligomers, polymers having a branched structure or straight-chain polymers. For instance, it may be a membrane made up of β-cyclodextrin crosslinked with epichlorohydrin, polyethylene-imine crosslinked with glutaraldehyde, or poly(4-vinylpyridine) crosslinked with dibromopropane.

By way of example but not by way of limitation, the filter cake 41 has a thickness in the range of 10 nm to 1 µm.

By way of example but not by way of limitation, the diameter m of the second pore 41c through the filter cake 41 is in the range of 0.5 nm to 5 nm.

Such a double-layered structure allows for filtration of smaller organic molecules, and permits the membrane filter to gain strength, contributing more to an extended service life of the membrane filter.

Third Embodiment of the Invention

FIGS. 5(a) and 5(b) are illustrations of yet another example of the inventive process for fabricating membrane filters: FIG. 5(a) is an illustration of the filtration step using an acid solution, and FIG. 5(b) is an enlarged perspective view of a substrate after filtration.

First of all, a funnel 34 with a porous substrate 2—on which a nanostrand sheet 3 and a filter cake 41 comprising an accumulation of organic molecules are formed—inserted into it is attached to a suction bin 33, as shown in FIG. 5(a), and an acid solution 36 is poured down the funnel 34. This enables only the nanostrand sheet to be so removed that a filter cake 41 can be formed on the porous substrate 2, as shown in FIG. 5(b). It is the filter cake 41 that provides a membrane filter 22 according to the third embodiment of the invention.

Figure 6:
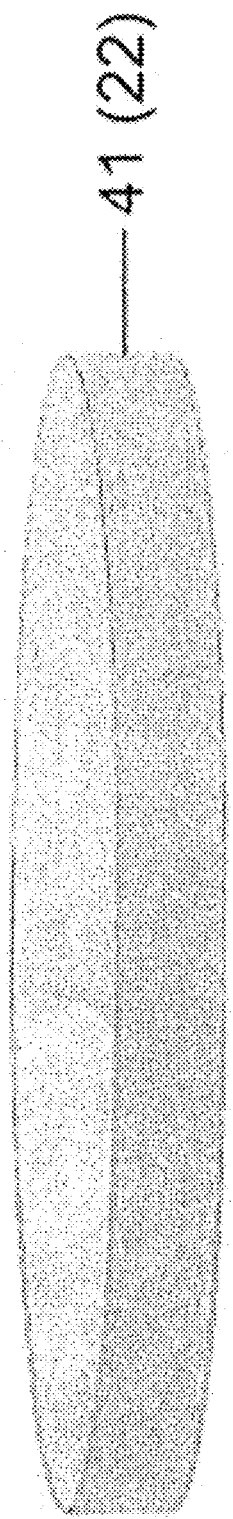
FIG. 6 is an illustration in perspective of yet another example of the inventive membrane filter.

FIG. 6 is an illustration in perspective of one example of the membrane filter 22 that is the third embodiment of the invention. The membrane filter 22 that is the third embodiment of the invention is the filter cake 41 shown in FIGS. 3(a), 3(b), and 3(c) and FIGS. 4(a), 4(b), and 4(c), which has the second pore 41c although not shown in FIG. 6.

Fourth Embodiment of the Invention

Figure 7A:
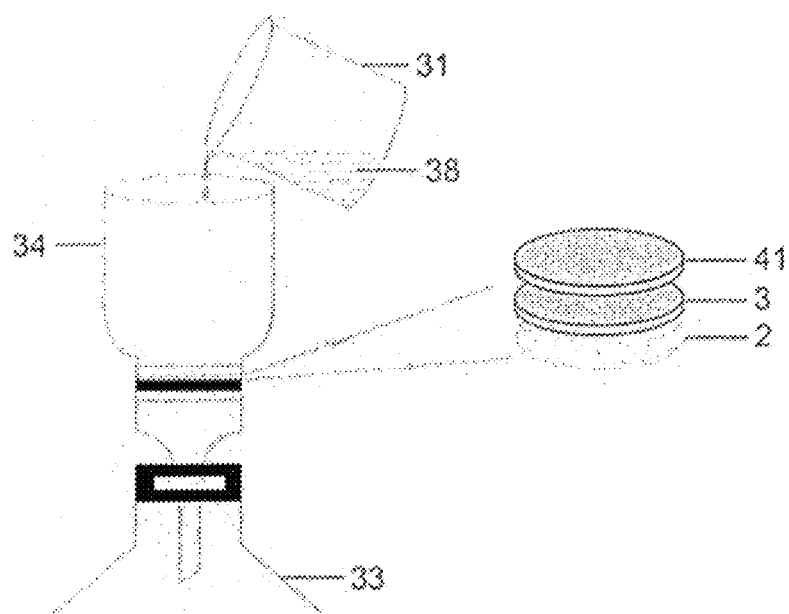
FIGS. 7(a) and 7(b) are illustrations of a further example of the inventive process for fabricating membrane filters.
Figure 7B:
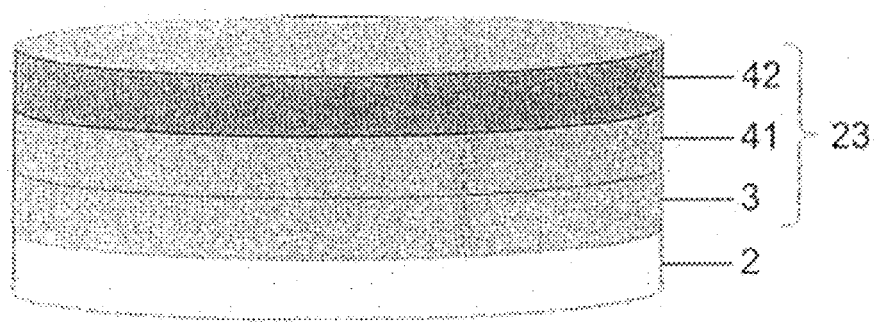

FIGS. 7(a) and 7(b) are illustrations of a further example of the inventive process for fabricating membrane filters: FIG. 7(a) is an illustration of the filtration step using a second organic molecule-containing solution, and FIG. 7(b) is an enlarged perspective view of a substrate after filtration.

First of all, a funnel 34 with a porous substrate 2—on which a nanostrand sheet 3 and a filter cake 41 comprising an accumulation of organic molecules are formed—inserted into it is attached to a suction bin 33, and a solution 38 containing separate organic molecules (the second organic molecules) from the organic molecules forming the filter cake 41 is poured down the funnel 34 for filtration, as shown in FIG. 7(a).

By virtue of filtration, a triple-layered structure made up of the nanostrand sheet 3, the first filter cake 41 and the second filter cake 42 is formed on the porous substrate 2, as shown in FIG. 7(b).

Figure 8A:
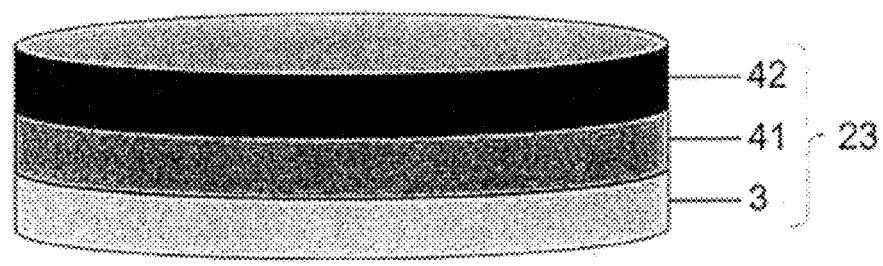
FIGS. 8(a) and 8(b) are illustrations of a further example of the inventive membrane filter.
Figure 8B:
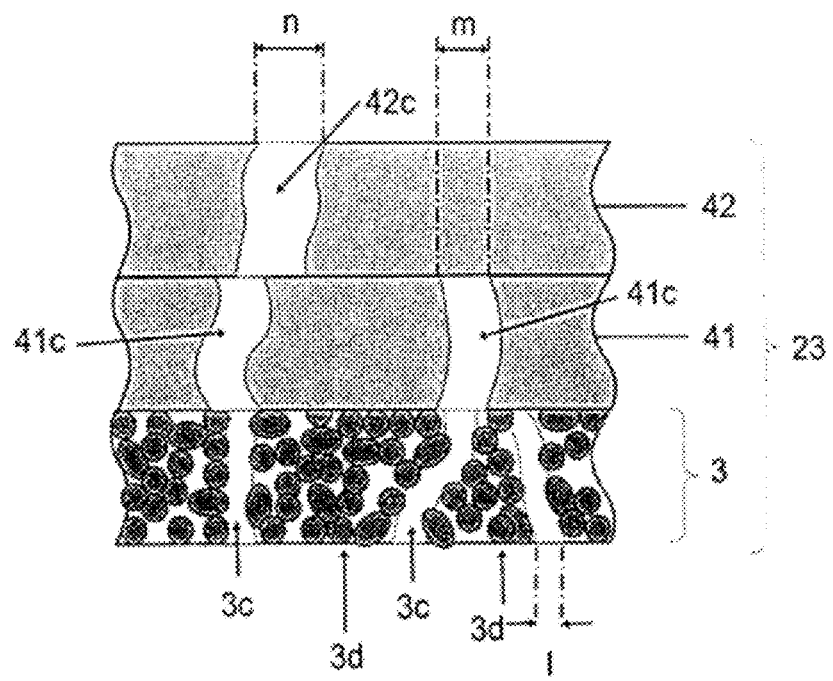

FIGS. 8(a) and 8(b) are illustrations of a further example of the inventive membrane filter: FIG. 8(a) is a perspective view of that filter, and FIG. 8(b) is a longitudinally sectioned view of FIG. 8(a).

As shown in FIGS. 8(a) and 8(b), the membrane filter 23 that is one particular embodiment of the invention has a triple-layered structure made up of a nanostrand sheet 3, a first filter cake 41 and a second filter cake 42.

In FIG. 8(b), the respective layers are shown to have pores having distinct diameters. The diameters of the pores through the respective layers are determined by the organic molecules forming the filter cakes, crosslinking conditions or the like. In FIG. 8(b), as an example, the diameter 1 of the first pore 3c through the filtrating nanostrand sheet 3 is shown to be the smallest, the diameter m of the second pore 41c through the first filter cake 41 is shown to be larger than that, and the diameter n of the third pore 42c through the second filter cake 42 is shown to be much larger.

There would be a number of possible advantages resulting from such a tripled-layered structure. Specifically, it is possible to combine together membrane functions such as the dynamic strength of the filter cakes, the diameters of the pores, the ability to be dissolved out in a solvent, hydrophilic capability, hydrophobic capability, biocompatibility, adsorption capability to solutes and dissolved ions, etc. For instance, the first filter cake 41 is improved in fractionating; however, when it is short of dynamic strength, it is used in combination with the second filter cake so that the dynamic strength can be increased without deterioration of fractionating capability.

The filter cake 42 is a membrane comprising an accumulation of organic molecules separate from those of the filter cake 41 and, at the same time, is an ultra-thin porous membrane.

The filter cake 42, for instance, is β-cyclodextrin crosslinked with epichlorohydrin, polyethylene-imine crosslinked with glutaraldehyde, and poly(4-vinylpyridine) crosslinked with dibromopropane.

By way of example but not by way of limitation, the filter cake 42 has a thickness in the range of 10 nm to 1 µm.

By way of example but not by way of limitation, the diameter n of the third pore through the filter cake 42 is in the range of 0.5 nm to 5 nm.

The process for fabricating membrane filters that is one particular embodiment of the invention comprises the step of mixing together a metal salt-containing aqueous solution and an alkali-containing aqueous solution to prepare a solution 32 of nanostrands formed of the metal hydroxide, and the step of filtrating the nanostrand solution 32 through the porous substrate 2 to fabricate the nanostrand sheet 3 in which the fibrous nanostrands 3d are accumulated on the porous substrate 2, and the maximum diameter of the first pore 3c formed between the nanostrands 3d and extending from one surface side of the nanostrand sheet to another surface side is set at up to 5 nm. With this fabrication process, it is possible to easily and reliably fabricate a membrane filter that has a multiplicity of fine pores, makes sure fast permeation of solutions, and has a smooth surface. Nanostrands, because of being vulnerable to acids, have been considered difficult-to-use unless subjected to resistance-to-acids treatment; however, they can be used as filters unless a feed solution for filtration operation is acidic. In other words, if the nanostrand solution is filtrated through a properly selected porous substrate, it is then possible to form a paper-like porous sheet (nanostrand sheet) that can stand up to filtration of nanometer-scaled fine particles, proteins, polymers or the like. The nanostrand sheet may be downscaled to an ultrathin level of 20 nm, and even so, it is dynamically robust so that it can be used as a membrane filter with the application of a pressure difference of 100 kPa to it.

With the process for fabricating membrane filters that is one particular embodiment of the invention, it is possible to form the nanostrand sheet out of the metal hydroxide for which any one of $Cd(OH)_2$, $Cu(OH)_2$ or $Zn(OH)_2$ is used and, hence, a membrane filter out of the aqueous solution at or near neutrality.

In the process for fabricating membrane filters that is one particular embodiment of the invention, the maximum diameter of the pores through the porous substrate 2 is set at up to 1.0 µm so that the efficiency of utilization of the nanostrands in the fabrication steps can grow high.

According to the process for fabricating membrane filters that is one particular embodiment of the invention, the solution 35 containing organic molecules is filtrated to form the filter cake 41 comprising an accumulation of the organic molecules on the nanostrand sheet 3. It is thus possible to fabricate a membrane filter having a plurality of combined features such as block capability and surface affinity.

According to the process for fabricating membrane filters that is one particular embodiment of the invention, the solution 38 containing organic molecules separate from those of the filter cake 41 is filtrated through the nanostrand sheet 3 having the filter cake 41 formed on it to form on the filter cake 41 another filter cake 42 comprising an accumulation of the aforesaid separate organic molecules. It is thus possible to fabricate a membrane filter having a plurality of combined features such as block capability and surface affinity.

According to the process for fabricating membrane filters that is one particular embodiment of the invention, the acid solution may pass through the nano-strand sheet having the filter cake 41 formed on it for removal of nanostrands made up of $Cd(OH)_2$ or the like. This embodiment may also be applied to fields where the dissolution of metal ions such as cadmium ions offers grave problems.

In the process for fabricating membrane filters that is one particular embodiment of the invention, the organic molecules used may be any one of β-cyclodextrin, polyethylene-imine or poly(4-vinylpyridine); that is, membrane filters can be fabricated using less costly hydrophilic polymers.

In the process for fabricating membrane filters that is one particular embodiment of the invention, after the formation of the filter cakes 41 and 42, they may be subjected to crosslinking treatment for stabilization.

The membrane filter 20, 21, 23 that is one particular embodiment of the invention is formed of the nanostrand sheet 3 comprising an accumulation of the nanostrands 3$d$ made up of the fibrous metal hydroxide, and the maximum diameter of the first pore 3$c$ provided through the nano-strand sheet 3 in such a way as to extend from one surface side 3$a$ to another surface side 3$b$ is set at up to 5 nm. By proper selection of the thickness of the nanostrand sheet 3, it is thus possible to obtain a membrane filter capable of fast removal of proteins, nanoparticles or polymers dispersed in a solution, each with a width of 3 nm or greater.

In the membrane filter 20, 21, 23 that is one particular embodiment of the invention, the metal hydroxide is any one of $Cd(OH)_2$, $Cu(OH)_2$ or $Zn(OH)_2$ so that the first pore 3$c$ having the maximum diameter of up to 5 nm can easily be formed through the nanostrand sheet 3. It is thus possible to obtain a membrane filter capable of fast removal of proteins, nanoparticles or polymers dispersed in a solution, each with a width of 3 nm or greater.

In the membrane filter 20, 21, 23 that is one particular embodiment of the invention, the maximum diameter of the nanostrand 3$d$ is set at up to 2.5 nm. It is thus possible to obtain a membrane filter capable of fast and reliable removal of proteins, nanoparticles or polymers dispersed in a solution, each with a width of 3 nm or greater.

In the membrane filter 20, 21, 23 that is one particular embodiment of the invention, the thickness of the nanostrand sheet 3 is set at up to 200 nm. It is thus possible to obtain a membrane filter capable of fast and more reliable removal of proteins, nanoparticles or polymers dispersed in a solution, each with a width of 3 nm or greater.

In the membrane filter 21, 23 that is one particular embodiment of the invention, the filter cake 41 comprising an accumulation of organic molecules is formed on one surface 3$a$ side of the nanostrand sheet 3, and the maximum diameter of the second pore 41$c$ provided through the filter cake 41 in such a way as to extend from one surface side to another surface side is set at up to 5 nm. It is thus possible to obtain a membrane filter capable of fast removal of organic molecules smaller than proteins, nanoparticles or polymers dispersed in a solution, each with a width of 3 nm or greater.

In the membrane filter 23 that is one particular embodiment of the invention, there is a laminated or stacked structure provided by two or more filter cakes 41 and 42. It is thus possible to obtain a membrane filter having a plurality of combined features such as block capability and surface affinity.

In the membrane filter 21, 22, 23 that is one particular embodiment of the invention, the organic molecules are any one of β-cyclodextrin, polyethylene-imine or poly(4-vinylpyridine). As they are allowed to react with epichlorohydrin, glutaraldehyde or dibromopropane, it enables a stable filter cake to be easily fabricated.

In the membrane filter 21, 22, 23 that is one particular embodiment of the invention, either one of the filter cake 41 or 42 is β-cyclodextrin crosslinked with epichlorohydrin for stabilization.

In the membrane filter 21, 22, 23 that is one particular embodiment of the invention, either one of the filter cake 41 or 42 is polyethylene-imine crosslinked with glutaraldehyde for stabilization.

In the membrane filter 21, 22, 23 that is one particular embodiment of the invention, either one of the filter cake 41 or 42 is poly(4-vinylpyridine) crosslinked with dibromopane for stabilization.

The membrane cake 22 that is one particular embodiment of the invention is made up of the filter cake 41 fabricated by the aforesaid process for fabricating membrane filters. If the nanostrands are removed from that membrane filter, it is possible to obtain a membrane filter that may be applied to fields where the dissolution of metal ions such as cadmium ions offers grave problems.

In the membrane filter that is one particular embodiment of the invention, the porous substrate 2 provided therethrough with a pore having the maximum diameter of up to 1.0 μm is stacked on another surface 3$b$ or 41$b$ side of the nanostrand sheet 3 or the filter cake 41. It is thus possible to obtain a high-strength filter improved in terms of pressure resistance.

The process for fabricating membrane filter and the membrane filter embodied herein are not limited to such embodiments as mentioned above; they may be modified in various ways within the technical idea of the invention. Specific embodiments of the invention are now explained with reference to the following examples yet without limitation to them.

Example 1

In Example 1, investigation was made of the separation of nanoparticles using a nanostrand sheet.

An aqueous solution (20 mL) of 4 mM cadmium chloride ($CdCl_2$) and an aqueous solution (20 mL) of 0.8 mM aminoethanol were mixed together under vigorous agitation, and the mixture was allowed to stand at room temperature for 10 minutes thereby preparing an aqueous solution of nanostrands made up of cadmium hydroxide ($Cd(OH)_2$).

This aqueous solution was filtrated through an anodized porous alumina filter having 0.2 μm pores (a porous substrate having a diameter of 1.7 cm and an aperture area rate of 50%) to obtain such nanostrand sheets as shown in Table 1.

TABLE 1

| | Cd(OH)$_2$ Nanostrands | | Aqueous Solution Filtration | |
|---|---|---|---|---|
| FNo. | Diameter* nm | Length* μm | Substrate* | Amount of Feed* mL |
| F-01 | 1.9 | 2~3 | A | 10 |
| F-02 | 1.9 | 2~3 | B | 1 |
| F-02 | 1.9 | 2~3 | B | 5 |
| F-04 | 1.9 | 2~3 | B | 10 |
| F-05 | 1.9 | 2~3 | B | 15 |

| | Nanostrand Sheet | | |
|---|---|---|---|
| FNo. | Thickness* nm | HDA* nm | Ref. Figure |
| F-01 | 200 | 3 | FIGS. 10(a), 10(b) |
| F-02 | 20 | >3 | No Reference |
| F-03 | 100 | >3 | No Reference |
| F-04 | 200 | 3 | No Reference |
| F-05 | 300 | 3 | No Reference |

Diameter*: Confirmed under a high-resolution transmission electron microscope
Length*: Confirmed under a scanning electron microscope.
Substrate*: Porous substrate used for the formation of the nanostrand sheet
A: Anodized porous alumina filter having 0.2 μm pores (of 1.7 cm in diameter and 50% in aperture area rate)
B: Polycarbonate membrane filter having 0.2 μm (of 1.7 cm in diameter and 10% in porosity)
Amount of Feed*: Total amount of the nanostrand aqueous solution fed to the substrate
Thickness*: Thickness of the nanostrand sheet measured from section observation
HDA*: Average diameter of permeation pores (pores) estimated from the block rate of the permeate FIGS. 10(a) and 10(b) are a set of scanning electron microphoto-graphs of the nanostrand sheet formed on the porous substrate.

To prevent sample charging, a 2 nm thick platinum is evaporated on the sample for electron microscopic viewing.

The nanostrand sheet has a constant thickness, and covers the pore openings in the porous alumina filter.

From an electron microphotograph of the sheet surface, attached hereto as FIG. 10(a), it can be seen that although the cadmium hydroxide nanostrands have a diameter of 1.9 nm, yet such elongate nanostrands are accumulated and formed into an intimate sheet.

From an electron microphotograph of the sheet section, attached hereto as FIG. 10(b), it can also be seen that the nanostrand sheet has a thickness of 200 nm.

The thickness of the nanostrand sheet could be adjusted depending on the amount of the aqueous solution of the nanostrands to be filtrated, and the thinnest sheet could be downscaled to a thickness of 20 nm.

For the porous substrate for the formation of the nanostrand sheet, use could also be made of a polycarbonate membrane filter having 0.2 μm pores.

The porous substrate used may have a pore size enough to block the nanostrands and allow the rest to permeate, and a substrate having pores of up to 1.0 μm is preferably used.

Figure 11:
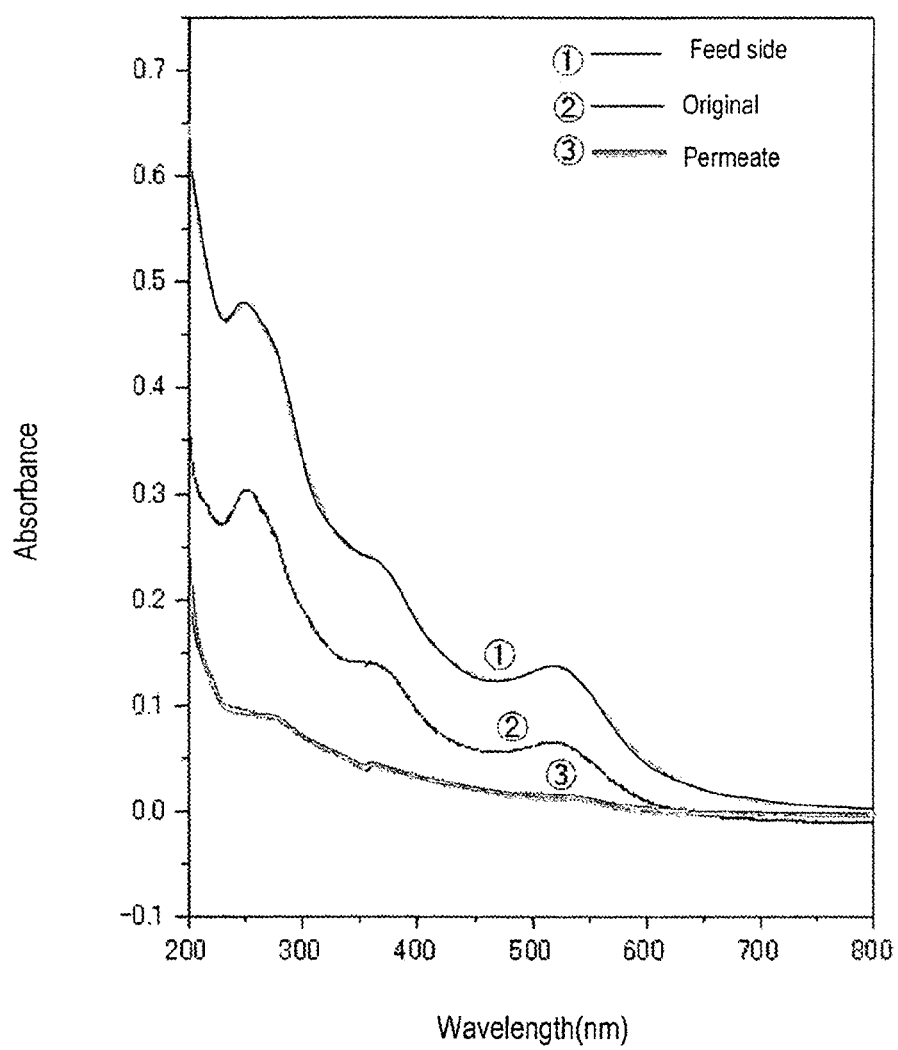
FIG. 11 is a graph indicative of ultraviolet/visible absorption spectra for a gold nanoparticle aqueous solution before and after filtration by a nanostrand sheet.

FIG. 11 is a graph indicative of the results of filtration experimentation for gold nanoparticles of 5 nm in diameter using 200 nm thick nanostrand sheet F-04 in Example 1: ultraviolet/visible absorption spectra before and after the filtration for an aqueous solution of gold nanoparticles by the nanostrand sheet. What is shown here is the absorbance of the solution filtrated (hereinafter called the permeate), the original solution used for filtration experimentation, and the solution remaining on the side of the nanostrand sheet on which the original solution is poured (hereinafter called the feed-side solution).

The concentration of gold nanoparticles is 0.001 wt % as calculated with gold atoms contained in the aqueous solution as weight percent of gold chloride.

At the time when 5 mL out of the aqueous solution (10 mL) of gold nanoparticles were filtrated, ultraviolet/visible absorption spectra were measured for the permeate. A peak derived from the plasmon absorption of the nanoparticles at or near 530 nm disappeared, which confirmed that the nanoparticles were filtrated.

At the time when 5 mL were filtrated, on the other hand, ultraviolet/visible absorption spectra were measured for the feed-side solution. The absorbance was then twice as high as that for the original solution (before filtration).

This indicates that the aqueous solution of nanoparticles is concentrated by the nanostrand sheet. The filtration rate of gold nanoparticles was 65 seconds at a differential pressure of 80 kPa in the case of using a porous substrate having an effective diameter of 1.7 cm and an aperture area rate of 10% (a polycarbonate membrane filter).

Hence, the flux on filtration is 13,000 L/hm$^2$. This result indicates that the nanostrand sheet is effective for the fast separation of nanoparticles or the like.

It is here to be noted that the "flux" used herein is calculated in terms of the effective area of the porous substrate (the aperture area rate is 50% for an anodized porous alumina filter).

The types and sizes of particles used for filtration experimentation and the results of experimentation are set out in Table 2.

TABLE 2

| | | | Permeate | | | |
|---|---|---|---|---|---|---|
| | | | | Contents | | |
| Estimation No. | FNo. | Medium | Material | Size | Amount | pH |
| 1 | F-04 | Water | Gold Particles | 5 nm$^\phi$ | 1 × 10$^{-3}$ wt | 7 |
| 2 | F-04 | Water | Gold Particles | 2 nm$^\phi$ | 1 × 10$^{-4}$ wt | 7 |
| 3 | F-04 | Water | Cytochrome C | 2.5 nm$^\phi$ | 50 μM | 7 |
| 4 | F-04 | Water | Myoglobin | 3.5 nm$^\phi$ | 50 μM | 7 |
| 5 | F-02 | Water | Myoglobin | 3.5 nm$^\phi$ | 50 μM | 7 |
| 6 | F-03 | Water | Myoglobin | 3.5 nm$^\phi$ | 50 μM | 7 |

| | Filter Performance | | |
|---|---|---|---|
| Estimation No. | Block Rate (%) | Flux (L/hm$^2$) | HAD* (nm) |
| 1 | 100 | 13,000 (80 kPa) | 3 |
| 2 | 0 | 18,000 (80 kPa) | 3 |
| 3 | 15 | 13,000 (80 kPa) | 3 |
| 4 | 70 | 714 (80 kPa) | 3 |

TABLE 2-continued

| | | Permeate | |
|---|---|---|---|
| 5 | 11 | 62,000 (80 kPa) | >3 |
| 6 | 20 | 59,000 (80 kPa) | >3 |

HAD*: Average diameter of the permeation pores (pores) estimated from the block rate for the contents As shown in Table 2, it has been found from the results of filtration experimentation that the 200 nm thick nanostrand sheet blocks the gold nanoparticles of 5 nm in diameter and allows for permeation of the rest, but it cannot block gold nanoparticles of 2 nm in diameter or it allows for permeation of them. Hence, this nanostrand sheet is considered to have pores of 5 nm at most formed through it.

When 5 mL out of an aqueous solution (10 mL, concentration: 50 µM, pH 7) of cytochrome C of 2.5 nm in diameter were filtrated using 200 nm thick nanostrand sheet F-04, the block rate was 15% and the flux was 13,000 L/hm².

When 2.7 mL out of an aqueous solution (10 mL, concentration: 50 µN, pH 7) of myoglobin of 3.5 nm in diameter were filtrated using 200 nm thick nanostrand sheet F-04, the block rate was 70% and the flux was 714 L/hm².

These results indicate that the 200 nm thick nano-strand sheets can block nanoparticles or the like having a width of 3 nm or greater, preferably 5 nm or greater, and allow for permeation of the rest.

The block rate of 20 nm thick nanostrand sheet F-02 was 11% for myoglobin, and the block rate of 100 nm thick nanostrand sheet F-03 was 20% for myoglobin.

At these thicknesses, some pores greater than 3 nm would be formed, resulting in only partial blockage of 3.5 nm myoglobin.

Example 2

In Example 2, the nanostrand sheet of Example 1 was used to prepare a polymer filter cake.

The polymer used herein was β-cyclodextrin crosslinked with epichlorohydrin. The crosslinked polymer was synthesized by the Zohrevand et al. method.

Specifically, 500 mg of β-cyclodextrin and 31.7 mg of 2-naphthol were added to an aqueous solution (6 mL) of 0.8 M sodium hydroxide, and they were stirred at 60° C.

After dissolution of β-cyclodextrin and 2-naphthol in the aqueous solution, 1 mL of epichlorohydrin was added dropwise to it over 45 minutes for copolymerization with β-cyclodextrin.

Fifty-five (55) minutes after the initiation of the dropwise addition of epichlorohydrin, water was added to adjust the whole solution amount to 60 mL so that the speed of copolymerization was delayed, and the pH was adjusted to 8 to keep the polymer from precipitation.

Figure 12A:
FIGS. 12(a), 12(b), and 12(c) are a set of SEM images of a filter cake of cyclodextrin polymer on a nanostrand sheet.
Figure 12B:
Figure 12C:
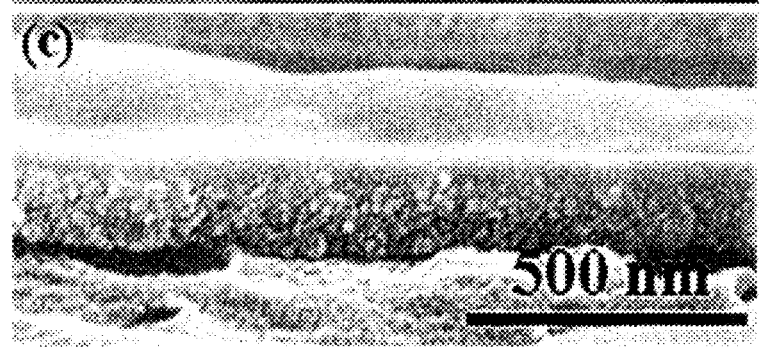

FIGS. 12(a), 12(b), and 12(c) are a set of scanning electron microphoto-graphs of a filter cake formed on the 200 nm thick nanostrand sheet formed by the process of Example 1 by filtrating a solution of 10 µL of the aforesaid polymer solution diluted to 5 mL through that nanostrand sheet.

From low-magnification photograph 12(a), it is evident that there is the nanostrand sheet present on the anodized porous alumina filter, and there is the polymer filter cake present on that.

The polymer filter cake has a smooth surface. As viewed from the backside, and as can be seen from the photograph attached hereto as FIG. 12(b), on the other hand, it is confirmed that the side of nanostrands in contact with the porous alumina filter has a structure matching the asperities of that filter.

From the electron microphotograph of the section attached hereto as FIG. 12(c), the polymer membrane was estimated to have a thickness of 65±5 nm.

The thickness of the polymer filter cake could be adjusted depending on the amount of the polymer solution used for filtration.

For instance, a filter cake having a thickness of 325±25 nm was formed out of a solution in which the polymer solution in an amount of 50 µL was diluted to 5 mL, and a filter cake having a thickness of 625±25 nm was formed out of a solution in which the polymer solution in an amount of 100 µL was diluted to 5 mL.

By diluting the polymer solution for use, it was also possible to form an ultrathin polymer filter cake.

For instance, it has been confirmed from filtration experimentation for dye molecules (see Example 6) that the pores (of up to 5 nm) through the nanostrand sheet are fully covered up with a 20 nm thick filter cake.

Example 3

In Example 3, a crosslinked polymer filter cake was prepared using a nanostrand sheet.

Polyethylene-imine (MW: 25,000) used as the polymer was crosslinked with glutaraldehyde to form a filter cake. Specifically, a 1 wt % polyethylene-imine aqueous solution (5 mL) and a 25 wt % glutaraldehyde aqueous solution (3 mL) were mixed together, and stirred at room temperature for 1 hour.

An aqueous solution in which the crosslinked polymer solution in an amount of 10 µL was diluted to 5 mL was filtrated through the nanostrand sheet formed by the process of Example 1 to form a filter cake on that nano-strand sheet.

Figures 13A, 13B, 13C:
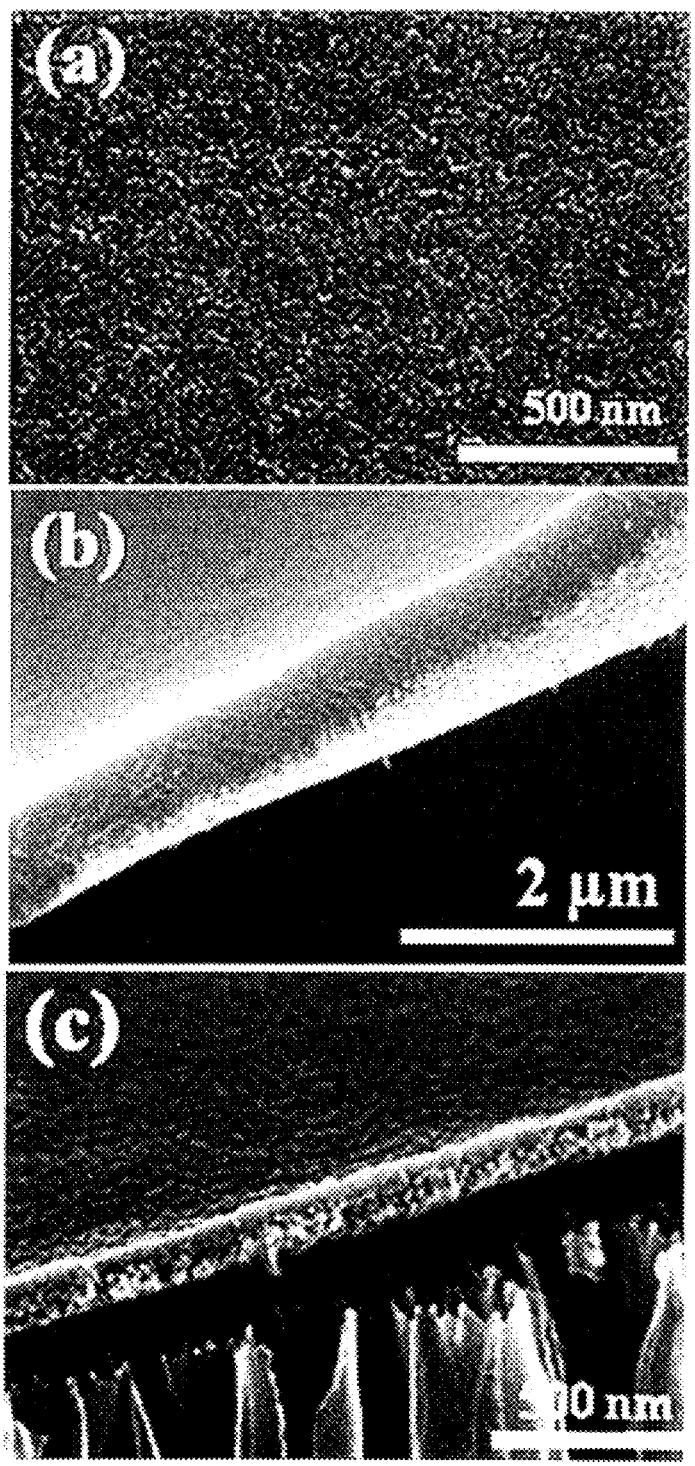
FIGS. 13(a), 13(b), and 13(c) are a set of SEM images of a filter cake of crosslinked polyethylene-imine on a nanostrand sheet.

A scanning electron microphotograph of the surface of that filter cake is attached hereto as FIG. 13(a). The surface of the nanostrand sheet was uniformly covered up with the crosslinked polyethylene-imine.

An electron microphotograph of the section of that filter cake is attached hereto as FIG. 13(b). The filter cake was estimated to have a thickness of 600 nm.

On the other hand, when a filter cake was formed by filtration of an aqueous solution in which the crosslinked polymer solution in an amount of 1 µL was diluted to 5 mL, it gained a thickness of 80 nm.

A scanning electron microphotograph of that filter cake is attached hereto as FIG. 13(c). From this photograph, it is confirmed that the filter cake is formed on the 100 nm thick nanostrand sheet.

The filter cake of polyethylene-imine crosslinked with glutaraldehyde was affected by the stirring time taken for the preparation of the crosslinked polymer.

When the stirring time was one day, there were cracks of 1 nm to 5 nm in width formed on the surface of the filter cake, and when the stirring time was 3 days, there were large cracks formed.

For this reason, too long a stirring time gave rise to the formation of a larger crosslinked polymer with the consequence that there would be cracks introduced in the filter cake.

The conditions for, and the results of, experimentation in Examples 2 and 3 are tabulated in Table 3.

TABLE 3

Mixed Solution of Polymer B or P Crosslinked with E or G

| PNo. | FNo. | Mo* Conc. (wt %) | Cr* Conc. (wt %) | Mo:Cr | Stirring Time (min.) | pH | Amount (mL) of Feed BF* |
|---|---|---|---|---|---|---|---|
| P-01 | F-04 | B 0.83 | E 1.97 | 1.0:2.4 | 55 | 7 | 5 (10 μL) |
| P-02 | F-04 | B 0.83 | E 1.97 | 1.0:2.4 | 55 | 7 | 5 (50 μL) |
| P-03 | F-04 | B 0.83 | E 1.97 | 1.0:2.4 | 55 | 7 | 5 (100 μL) |
| P-04 | F-01 | B 0.83 | E 1.97 | 1.0:2.4 | 55 | 7 | 5 (100 μL) |
| P-05 | F-04 | B 0.83 | E 1.97 | 1.0:2.4 | 55 | 7 | 30 (3 μL) |
| P-06 | F-04 | B 0.83 | E 1.97 | 1.0:2.4 | 55 | 7 | 20 (2 μL) |
| P-07 | F-04 | B 0.83 | E 1.97 | 1.0:2.4 | 55 | 7 | 10 (1 μL) |
| P-08 | F-04 | P 0.62 | G 9.36 | 1.0:15.1 | 60 | 7 | 5 (10 μL) |
| P-09 | F-04 | P 0.62 | G 9.36 | 1.0:15.1 | 60 | 7 | 5 (1 μL) |

| | Filter Cake | |
|---|---|---|
| PNo. | Thickness (nm) | Voids (nm) |
| P-01 | 65 (FIG. 12(a), 12(b), 12(c)) | >1.5 |
| P-02 | 325 | >1.5 |
| P-03 | 625 | 1.5 |
| P-04 | 625 | 1.5 |
| P-05 | 30 | >1.5 |
| P-06 | 20 | >1.5 |
| P-07 | <20 | >1.5 |
| P-08 | 600 (FIGS. 13a, 13(b)) | 2.0 |
| P-09 | 80 (FIG. 13(c)) | >2.0 |

Mo*: Aqueous solution of the monomer or oligomer
B: β-Cyclodextrin
P: Polyethylene-imine
Cr*: Crosslinking agent solution for crosslinking of Mo
E: Epichlorohydrin
G: Glutaraldehyde
Voids: Average diameter of the voids estimated from the block rate for dyes
Amount of Feed BF*: Amount of the crosslinked polymer solution filtrated through the nanostrand sheet (the bracketed figure is indicative of the amount of the crosslinked polymer solution before dilution)

Example 4

In Example 4, a nanostrand sheet was used to prepare a polymer filter cake, followed by removal of the nanostrands, thereby preparing a free-standing polymer membrane.

For filter cake preparation, use was made of a solution of the polymer in which the β-cyclodextrin used in Example 2 was crosslinked with epichlorohydrin.

Figure 14A:
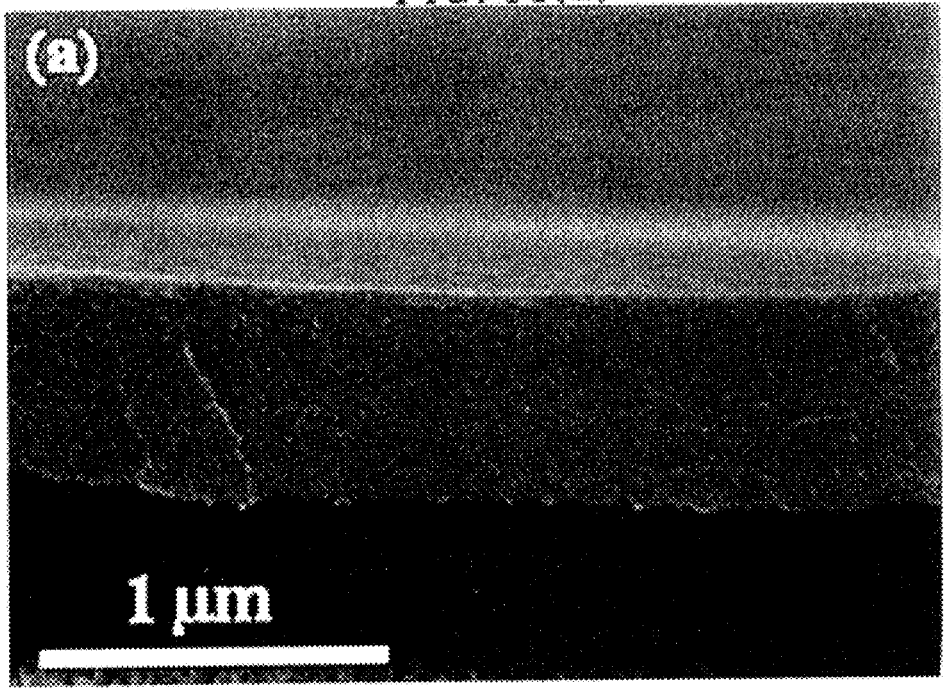
FIGS. 14(a) and 14(b) are a set of SEM images of a cyclodextrin polymer free-standing membrane.
Figure 14B:
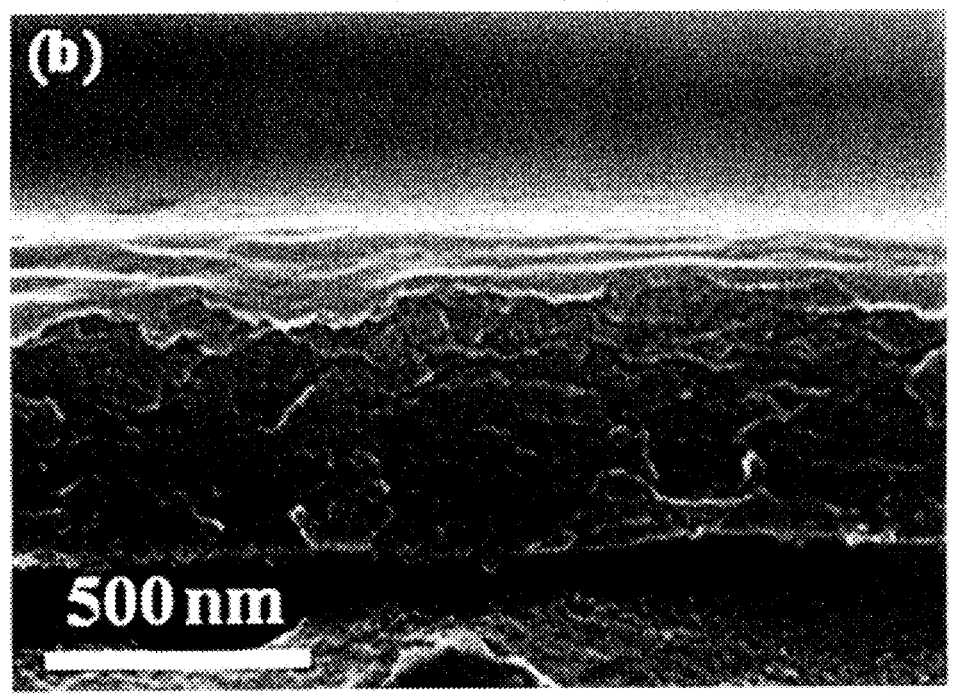

FIGS. 14(a) and 14(b) are a set of scanning electron microphoto-graphs of a free-standing membrane that was formed by forming a filter cake of 625±25 nm, permeating a 100 mM hydrochloric acid aqueous solution (3 mL) through that filter cake and 5 mL of purified water three times through the filter cake, and removing the nanostrands.

FIG. 14(a) is a photograph of the free-standing membrane formed using an anodized porous alumina filter as the porous substrate and FIG. 14(b) is a photograph of a free-standing membrane formed using a polycarbonate membrane filter as the porous substrate.

It can be confirmed that both the free-standing membranes have a constant thickness of 625 nm, and that only the nanostrands are dissolved out by acid treatment, as set out typically in Table 4.

This example reveals that even in the absence of nanostrands, the polymer membrane can be formed in the form of a free-standing ultrafilter membrane.

TABLE 4

| | Free-Standing Polymer Membrane | | | |
|---|---|---|---|---|
| SNo. | PNo. | Thickness nm | Pore Width nm | Ref. Drawing |
| S-01 | P-01 | 65 | >1.5 | |
| S-02 | P-02 | 325 | >1.5 | |
| S-03 | P-03 | 625 | 1.5 | FIG. 14b |
| S-04 | P-04 | 625 | 1.5 | FIG. 14a |
| S-05 | P-08 | 600 | 2.0 | |

Example 5

In Example 5, a laminated or stacked filter cake was prepared using a nanotrand sheet.

For filter cake preparation, use was made of a solution of the polymer used in Example 2: β-oyclodextrin crosslinked with epichlorohydrin, and a solution of the polymer used in Example 3: polyethylene-imine crosslinked with glutaraldehyde.

Figure 15:
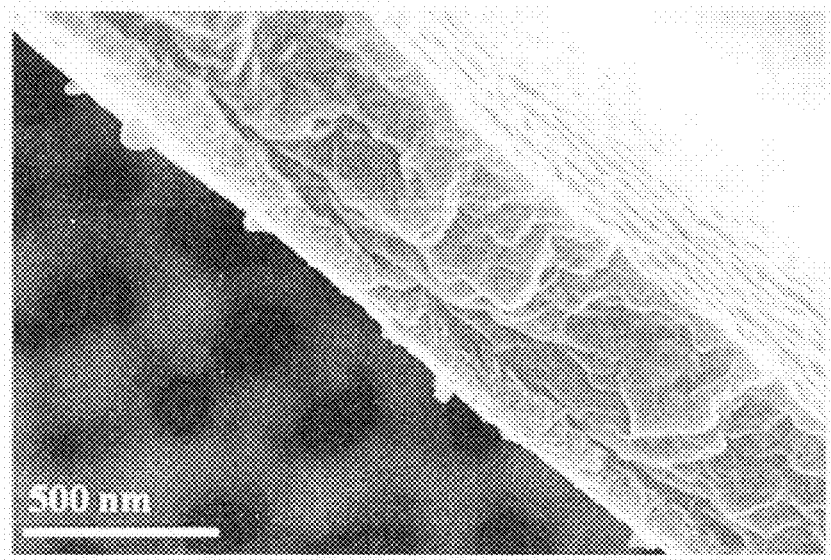
FIG. 15 is an SEM image of a double-layered structure filter cake comprising a cyclodextrin polymer and crosslinked polyethylene-imine.

FIG. 15 is a scanning electron microphotograph of the section of a laminated filter cake that was prepared by filtrating an aqueous solution—in which 5 mL of the solution of the crosslinked polymer was diluted to 5 mL—through the nanostrand sheet formed by the process of Example 1, and filtrating another aqueous solution—in which 1 μL of the solution of the crosslinked polymer used in Example 3 was diluted to 5 mL—through that nanostrand sheet.

From the photograph, it can be confirmed that a cyclodextrin-containing filter cake of 325 nm in thickness is formed on the 150 nm thick nanostrand sheet, and a polyethylene-imine-containing filter cake of 80 nm in thickness was formed on the first-mentioned filter cake.

The conditions for, and the results of, experimentation in Example 5 are set out in Table 5.

TABLE 5

| WNo. | FNo. | 1st Aqueous Solution | | 2nd Aqueous Solution | |
|---|---|---|---|---|---|
| | | PNo. | Feed* (mL) | PNo. | Feed* (mL) |
| W-01 | F-01 | P-02 | 5 (50 µL) | P-09 | 5 (1 µL) |

| | Filter Cake (Thickness) | |
|---|---|---|
| WNo. | 1st Layer (nm) | 2nd Layer (nm) |
| W-01 | 325 | 80 |

PNo.: The components of the polymer solutions used in the instant example and shown in Examples 2 and 3 are indicated by PNos. shown in Tables 3 and 4
Feed*: The amount of the crosslinked polymer solutions filtrated through the nanostrand sheet (the bracketed figures are indicative of the amount of the crosslinked polymer solutions fed)

Example 6

In Example 6, it has been confirmed that a filter cake prepared using a nanostrand sheet is a porous membrane that can be used as a separation membrane.

By means of the process of Example 4, a polymer free-standing membrane ridden of nanostrands was formed on a polycarbonate membrane filter (a porous substrate having a diameter of 1.7 cm and an aperture area rate of 10%). Using that free-standing membrane, filtration experimentation was performed for dye molecules. The results are set out in Table 6.

TABLE 6

| | | | Peremeate | | | |
|---|---|---|---|---|---|---|
| SANo. | SNo. | Dye | MW | Size | Concentration | pH |
| 1 | S-01 | PC/Cu | 892.3 | 1.7 × 1.7 nm | 30 µg/ml | 7 |
| 2 | S-02 | " | " | " | " | 7 |
| 3 | S-03 | " | " | " | " | 7 |
| 4 | S-01 | SRAB | 580.66 | 1.4 × 1.4 nm | 50 µM | 7 |
| 5 | S-02 | " | " | " | " | 7 |
| 6 | S-03 | " | " | " | " | 7 |
| 7 | S-01 | DY50 | 864.9 | 1.2 × 3.1 nm | 50 µM | 7 |
| 8 | S-02 | " | " | " | " | 7 |
| 9 | S-03 | " | " | " | " | 7 |

| SANo. | Flux L/hm² (Pressure Difference) | Block Rate (%) |
|---|---|---|
| 1 | 203 (80 kPa) | 99.6 |
| 2 | 82 (80 kPa) | 99.8 |
| 3 | 74 (80 kPa) | 99.9 |
| 4 | 458 (80 kPa) | 20.6 |
| 5 | 73 (80 kPa) | 27.4 |
| 6 | 71 (90 kPa) | 46.9 |
| 7 | 423 (80 kPa) | 9.5 |
| 8 | 115 (80 kPa) | 26.2 |
| 9 | 66 (80 kPa) | 63 |

PC/Cu: Copper (II) Phthalocyanine Tetrasulfonate
SRAB: Sulforhodamine B
DY50: Direct Yellow 50

For the dye molecules, use was made of PC/Cu (see Table 6), SRAB (see Table 6), and DY50 (see Table 6).

The molecular weights, sizes and concentrations of the respective dye molecules and the pH of aqueous solutions as well as the fluxes and block rates at a differential pressure of 80 kPa (or 90 kPa) are all indicated in Table 6.

It has been confirmed that although PC/Cu is a square dye molecule having one side of 1.7 nm, yet the block rate of the free-standing membranes having a thickness of 65 nm, 325 nm, and 625 nm for that dye molecule was found to be 99% or greater.

When the thickness of the free-standing membrane was 65 nm, the filtration rate was 203 L/hm² at a differential pressure of 80 kPa.

It has been confirmed that PC/Cu is quantitatively concentrated by the 65 nm thick free-standing membrane the way the gold nanoparticles were concentrated by the nanostrand sheet in Example 1.

Although SARB is a dye having one plus charge and 2 minus charges, yet the block rate of the 65 nm thick free-standing membrane was 20.6% for that dye.

On the other hand, the block rate of that free-standing membrane was as low as 9.5% for DY50: an elongate dye molecule.

These results indicate that the inventive filter cake is a porous membrane that provides an ultrafiltration membrane effective for separation of dye molecules or the like.

Example 7

In Example 7, it has been confirmed that a filter cake prepared using a nanostrand sheet is a porous membrane capable of fast concentration of organic molecules.

First of all, a nanostrand sheet was formed on a polycarbonate membrane filter by the process of Example 1.

Then, a 600 nm thick filter cake made up of crosslinked polyethylene-imine was formed by the process of Example 3.

Finally, a 100 mM hydrochloric acid aqueous solution (3 mL) was allowed to permeate through the filter cake, and 5 mL of purified water were allowed to permeate three times through the filter cake for removal of the nanostrands, thereby forming a free-standing membrane of crosslinked polyethylene-imine on the membrane filter.

Figure 16:
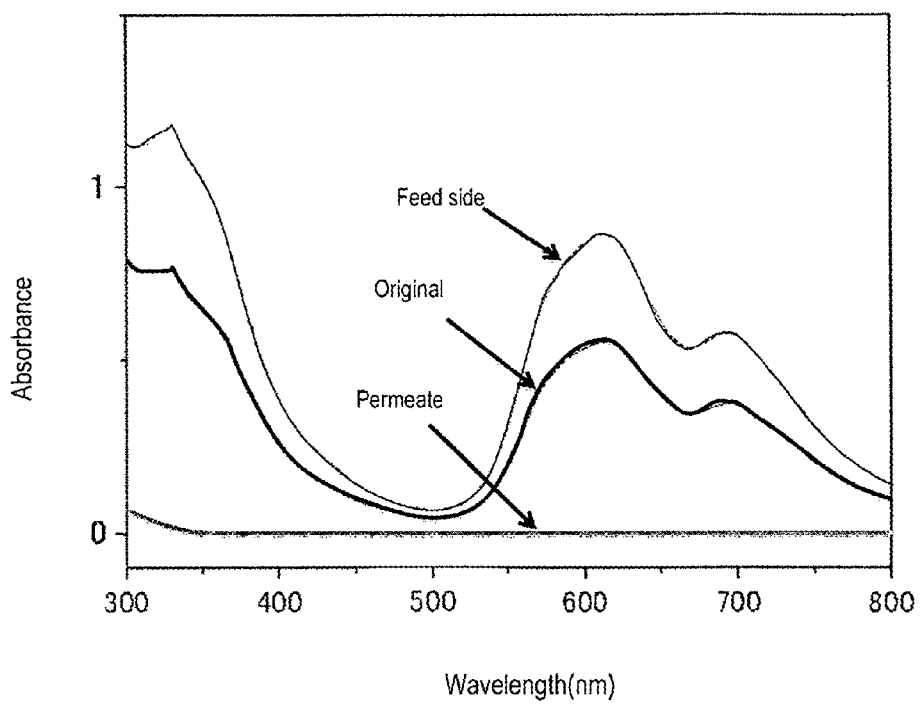
FIG. 16 is a graph indicative of ultraviolet/visible absorption spectra before and after filtration for a PC/Cu aqueous solution by a crosslinked polyethylene-imine free-standing membrane.

Filtration experimentation was carried out while PC/Cu was selected as the dye molecule for a membrane filter made up of the filter cake of crosslinked polyethylene-imine. The results are summed up in FIG. 16.

The concentration of PC/Cu is 30 µg/mL. At the time when 5 mL out of the PC/Cu aqueous solution (10 mL) were filtrated, the permeate was measured for ultraviolet/visible absorption spectra. A peak at or near 615 nm disappeared, evidence that the dye molecule was filtrated.

At the time when 5 mL were filtrated, on the other hand, the feed-side solution was measured for ultraviolet/visible absorption spectra. The absorbance increased from that of the original solution (before filtration). That is, the PC/Cu aqueous solution was concentrated by the free-standing membrane of crosslinked polyethylene-imine.

When the porous substrate having an effective diameter of 1.7 cm and an aperture area rate of 10% was used, the filtration speed of the dye molecule was 4.7 mL at a differential pressure of 85 kPa (for a filtration time of 4 minutes). Hence, the flux on filtration is 3,110 L/hm².

The ability of the free-standing membrane of crosslinked polyethylene-imine S-05 to separate water-soluble dyes at varying pH values is shown in Table 7.

TABLE 7

| | | | Permeate | | | |
|---|---|---|---|---|---|---|
| PANo. | PNo. | Dye | MW | Size | Concentration | pH |
| 1 | S-05 | PC/Cu | 892.3 | 1.7 × 1.7 nm | 30 μg/ml | 4 |
| 2 | S-05 | " | " | " | " | 7 |
| 3 | S-05 | " | " | " | " | 10 |

| PANo. | Flux (L/hm² (Pressure Difference) | Block Rate (%) |
|---|---|---|
| 1 | 3,440 (80 kPa) | 99.5 |
| 2 | 3,110 (85 kPa) | 99.8 |
| 3 | 2,840 (80 kPa) | 97.8 |

Set out in Table 7 are the molecular weights and sizes of PC/Cu and the concentrations and pH of its aqueous solution as well as the fluxes and block rates (%) at a differential pressure of 80 kPa, and 85 kPa. The pH was adjusted by the addition of hydrochloric acid or sodium hydroxide.

With the aqueous solutions of PC/Cu of pH 4 and pH 7, there was a block rate of 90% or greater confirmed. At pH 10, on the other hand, the block rate went somewhat down.

The PC/Cu aqueous solutions had a flux of 3,440 L/hm² and 2,840 L/hm², respectively, at pH 4 and 10. The fluxes at the respective pH values are 4,300 L/hm² bar (pH 4), 3,660 L/hm² bar (pH 7) and 3,550 L/hm² bar (pH 10) as calculated on a 1 bar basis differential pressure (=100 kPa or 0.987 atm.).

These results indicate that the inventive filter cakes are porous membranes effective for fast concentration of organic molecules.

Example 8

In Example 8, it has been confirmed that if filter cakes prepared using nanostrand sheets are chemically crosslinked, they then make sure fast filtration of organic molecules, and proteins.

Poly(4-vinylpyridine)(MW: 160,000) was used as a polymer, and crosslinked with dibromopropane to form filter cakes.

More specifically, a dimethylsulfoxide solution (2 mL) containing 52.5 mg of poly(4-vinylpyridine) and 40.4 mg of dibromopropane was stirred at room temperature for 7 days to obtain a gel solution having fluidity. 0.5 gram of this solution was diluted by water to 50 mL, thereby preparing an aqueous solution in which the concentration of monomer units of poly(4-vinylpyridine) became 2.5 mM.

A given amount (100 μL to 1,000 μL) of the crosslinked polymer aqueous solution was diluted by water to 5 mL, and the resultant aqueous solution was filtrated through the nanostrand sheet formed by the process of Example 1 to form a filter cake on it.

Then, a 10 mM hydrochloric acid aqueous solution (10 mL) was allowed to permeate through the filter cake for removal of the nanostrands that were a filter cake carrier, and ethanol that was a poor solvent for poly(4-vinylpyridine) was poured over the filter cake, after which it was let stand for 30 minutes for dehydration.

Then, 20.2 mg of an ethanol solution of dibromopropane were filtrated through the thus prepared filter cake free-standing membrane over 1 hour. After that, the reduced pressure applied was released off, letting the filter cake stand for 19 hours for further crosslinking of poly(4-vinylpyridine). Then, ethanol was permitted to permeate through the filter cake for removal of excessive dibromopropane, followed by permeation of water.

Table 8 shows examples of the polymer free-standing membrane prepared by the aforesaid process.

TABLE 8

| | | | | Mixed Solution of Crosslinked Polymer | | | |
|---|---|---|---|---|---|---|---|
| SNo. | FNo. | Mo$^x$/mg | Cr$^x$/mg | Solvent (volume) | Mo*:Cr* | Reaction Days | Amount of Feed*/mL |
| S-06 | F-04 | P4VP/52.5 | D/40.4 | DMSO (2 mL) | 1:0.4 | 7 | 5 (100 μL) |
| S-07 | F-04 | P4VP/52.5 | D/40.4 | DMSO (2 mL) | 1:0.4 | 7 | 5 (250 μL) |
| S-08 | F-04 | P4VP/52.5 | D/40.4 | DMSO (2 mL) | 1:0.4 | 7 | 5 (500 μL) |
| S-09 | F-04 | P4VP/52.5 | D/40.4 | DMSO (2 mL) | 1:0.4 | 7 | 5 (1,000 μL) |

| | Crosslinking of Filter Cakes | | Free-Standing Polymer Membrane | | |
|---|---|---|---|---|---|
| SNo. | Weight of Crosslinked Polymer/mg | Cross-linking Time | Thickness/nm | Voids*/nm | Flux*/ L/hm² |
| S-06 | 20.2 | 20 | 40 | 2 | 563 |
| S-07 | 20.2 | 20 | 80 | 2 | 447 |
| S-08 | 20.2 | 20 | 135 | 2 | 332 |
| S-09 | 20.2 | 20 | 265 | 2 | 250 |

Mo*: Poly(4-vinylpyridine) indicated by P4VP in this table

Cr*: Dibromopropane indicated by D in this table

Amount of Feed*: Volume of the aqueous solution of poly (4-vinylpyridine) used for filtration (the bracketed figure is indicative of the gel solution before dilution by water)

Voids*: Average diameter of the voids estimated from the block rate for the dye

Flux*: Filtration flux of water at a differential pressure of 80 kPa.

From the block rates for the dyes, the voids in the polymer free-standing membrane was estimated to have a size of approximately 2 nm.

The permeation rates (flux) of water under the conditions set out in Table 8 was in the range of 250 L/hm$^2$ to 563 L/hm$^2$ at a differential pressure of 80 kPa.

Figure 17:
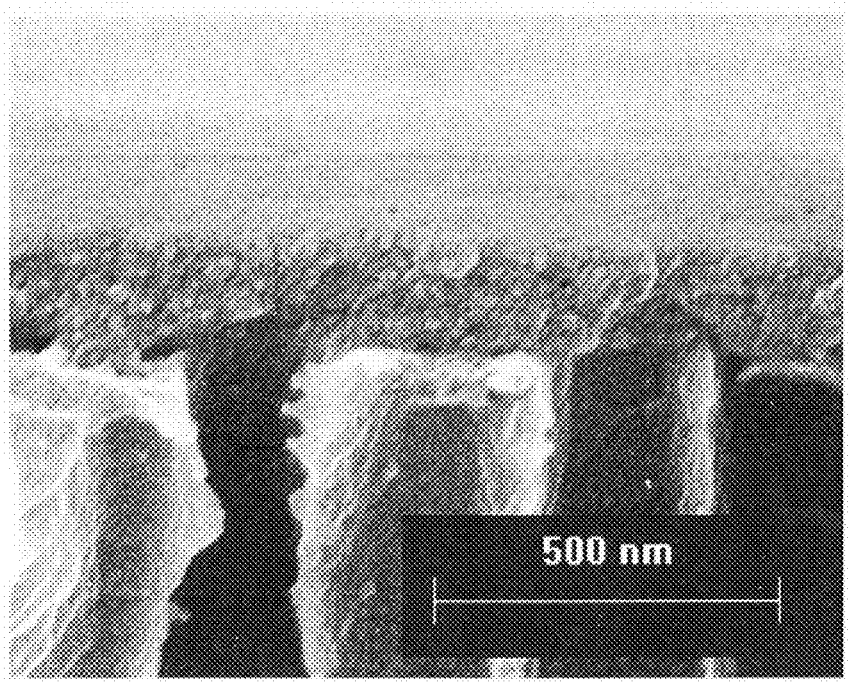
FIG. 17 is an SEM image of a free-standing membrane of poly(4-vinylpyridine) crosslinked with dibromopropane.

FIG. 17 shows an SEM image in section of the polymer free-standing membrane prepared under the conditions S-08: an SEM image of the poly(4-vinylpyridine) free-standing membrane crosslinked with dibromopropane.

Table 9 shows the fluxes and block rates upon filtration through polymer free-standing membranes S-06 to S-08 of cytochrome C, an aqueous solution of meso-tetra(N-methyl-4-pyridyl)porphintetrasil salt, or a mixed aqueous solution of mono-6-O-(p-toluenesulfonyl)-γ-cyclodextrin and 1-adamantanol.

The polymer free-standing membrane that is crosslinked poly(4-vinylpyridine) has more or less a certain block rate even for such supramolecular structures of 2 nm at most.

Figure 18:
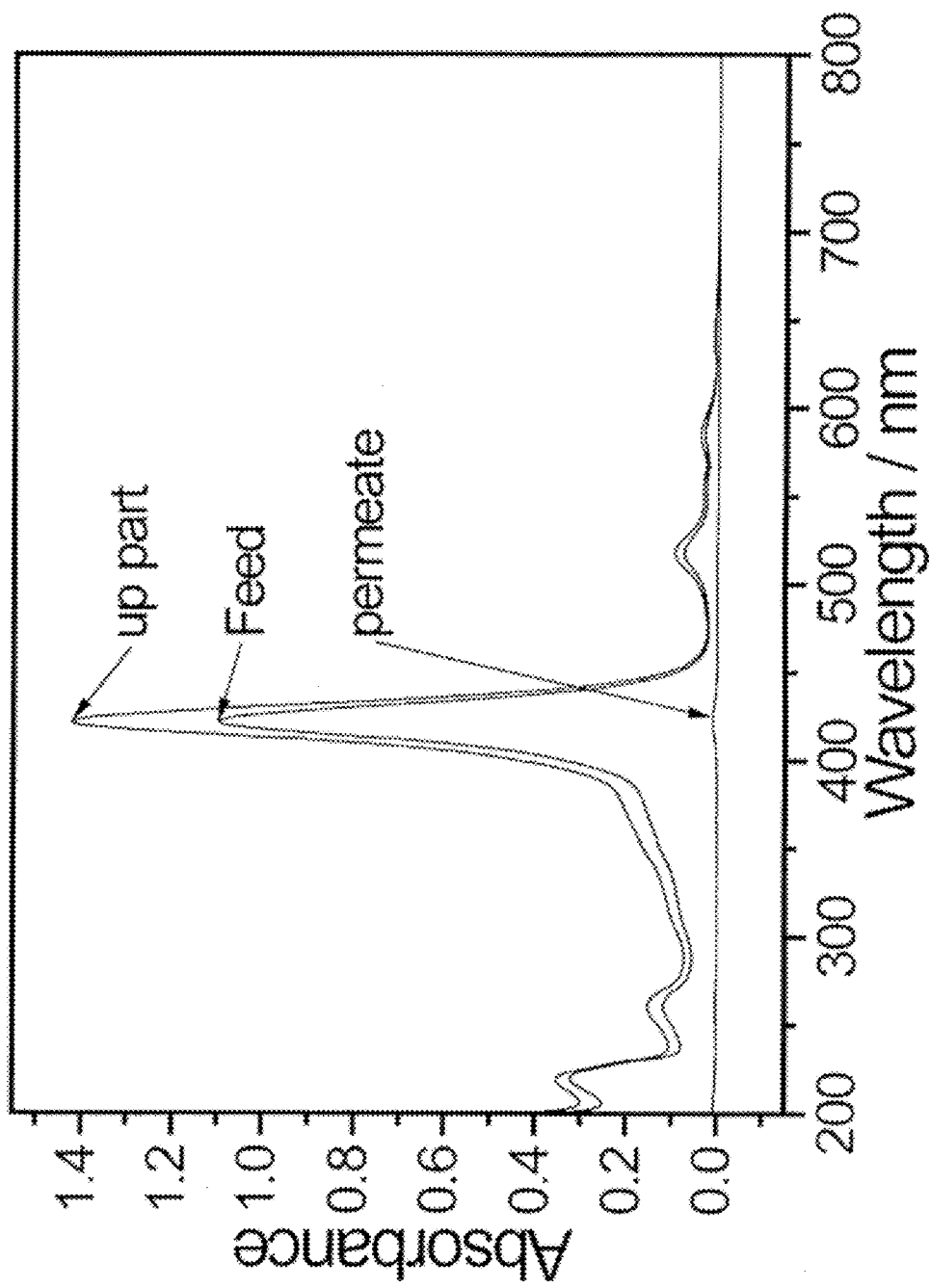
FIG. 18 is a graph indicative of ultraviolet/visible absorption spectra for a TMPyP aqueous solution (Feed), a TMPyP aqueous solution (Permeate) filtrated through a free-standing membrane crosslinked with dibromopropane, and a TMPyP aqueous solution (up-part) concentrated by that free-standing membrane.

FIG. 18 is a graph indicative of the ultraviolet/visible absorption spectra for the feed, the permeate, and the up-part, respectively, in the case of carrying out filtration experimentation of a TMPyP aqueous solution under condition SANo. 27 using the polymer free-standing membrane prepared under condition S-08.

The feed is a TMPyP aqueous solution; the permeate is a TMPyP aqueous solution after filtration through the free-standing membrane that is poly(4-vinylpyridine) crosslinked with dibromopropane; and the up-part is a TMPyP aqueous solution concentrated by that free-standing membrane.

TABLE 9

| SANo. | SNo. | Solute Molecule | Size | Concentration | pH | Permeate Flux L/hm$^2$ | Block Rate % |
|---|---|---|---|---|---|---|---|
| 10 | S-06 | Cyt.c* | 2.5 × 2.5 × 3.7 nm | 20 μg/mL | 2 | 309 | 88.8 |
| 11 | S-07 | Cyt.c* | 2.5 × 2.5 × 3.7 nm | 20 μg/mL | 2 | 263 | 98.2 |
| 12 | S-08 | Cyt.c* | 2.5 × 2.5 × 3.7 nm | 20 μg/mL | 2 | 196 | 99.1 |
| 13 | S-06 | Cyt.c* | 2.5 × 2.5 × 3.7 nm | 20 μg/mL | 4 | 466 | 95.3 |
| 14 | S-07 | Cyt.c* | 2.5 × 2.5 × 3.7 nm | 20 μg/mL | 4 | 392 | 99.4 |
| 15 | S-08 | Cyt.c* | 2.5 × 2.5 × 3.7 nm | 20 μg/mL | 4 | 305 | 99.3 |
| 16 | S-06 | Cyt.c* | 2.5 × 2.5 × 3.7 nm | 20 μg/mL | 6 | 399 | 93.8 |
| 17 | S-07 | Cyt.c* | 2.5 × 2.5 × 3.7 nm | 20 μg/mL | 6 | 344 | 96.8 |
| 18 | S-08 | Cyt.c* | 2.5 × 2.5 × 3.7 nm | 20 μg/mL | 6 | 270 | 96.9 |
| 19 | S-06 | Cyt.c* | 2.5 × 2.5 × 3.7 nm | 20 μg/mL | 8 | 614 | 98.2 |
| 20 | S-07 | Cyt.c* | 2.5 × 2.5 × 3.7 nm | 20 μg/mL | 8 | 536 | 98.8 |
| 21 | S-08 | Cyt.c* | 2.5 × 2.5 × 3.7 nm | 20 μg/mL | 8 | 413 | 99.2 |
| 22 | S-06 | Cyt.c* | 2.5 × 2.5 × 3.7 nm | 20 μg/mL | 9 | 305 | 100 |
| 23 | S-07 | Cyt.c* | 2.5 × 2.5 × 3.7 nm | 20 μg/mL | 9 | 290 | 100 |
| 24 | S-08 | Cyt.c* | 2.5 × 2.5 × 3.7 nm | 20 μg/mL | 9 | 277 | 100 |
| 25 | S-06 | TMPyP* | 1.7 × 1.7 nm | 5 μM | 7 | 638 | 79.9 |
| 26 | S-07 | TMPyP* | 1.7 × 1.7 nm | 5 μM | 7 | 364 | 96.9 |
| 27 | S-08 | TMPyP* | 1.7 × 1.7 nm | 5 μM | 7 | 202 | 99.0 |
| 28 | S-06 | γCD-ts&1-admantanol* | Diameter 1.7 nm | 0.1 mM:0.5 mM | 7 | 422 | 39.2 |
| 29 | S-07 | γCD-ts&1-adamantanol* | Diameter 1.7 nm | 0.1 mM:0.5 mM | 7 | 467 | 28.5 |
| 30 | S-08 | γCD-ts&1-adamantanol* | Diameter 1.7 nm | 0.1 mM:0.5 mM | 7 | 267 | 37.5 |

Cyt.C*: Cytochrome C derived from the horse's heart
TMPyP*: Aqueous solution of meso-tetra[N-methyl-4-pyridyl]porphinetetrasyl salt
γCD-ts & 1-adamantanol*: Mixed aqueous solution of mono-6-O-(p-toluenesulfonyl)-γ-cyclodextrin and 1-adamantanol (containing 1% ethanol as a solvent)
Flux*: Flux of permeation of water at a differential pressure of 80 kPa These results reveal that the polymer free-standing membrane that is crosslinked poly(4-vinylpyridine) has high block rates for proteins and dyes.

In the mixed aqueous solution of mono-6-O-(p-toluenesulfonyl)-γ-cyclodextrin and 1-adamantanol, 1-adamantanol is included in the cyclodextrin ring, yielding s supramolecular structure of 1.7 nm in diameter.

FIG. 18 shows the results of measurement for absorption spectra at the time when 2.38 mL out of 10 mL of the TMPyP aqueous solution (pH 7) at a concentration of 5 μM permeated in filtration experimentation.

Those results show that the inventive polymer free-standing membrane allows for efficient concentration of dyes.

The inventors have gone deep into the possibility of whether or not the paper-like porous sheet (nanostrand sheet) obtained by filtration of nanostrands not subjected to any surface treatment can by itself be used as a membrane filter.

As already mentioned, the nanostrands, because of being a metal hydroxide, are readily dissolved in acidic aqueous solutions.

However, it has now been found that the nanostrand sheet formed on a substrate having pores of the order of a few hundreds of nanometers is not dissolved in neutral or basic aqueous solutions even when it is in contact with them.

It has also been found that the nanostrand sheet may be downscaled to a level of as thin as 20 nm, and is so dynamically robust that it can be used as a membrane filter even with the application to it of a differential pressure of 100 kPa.

In that nanostrand sheet, there are pores (permeation pores) formed in gaps in the fibrous structure.

As shown in Example 1, those gaps allow for permeation of 2 nm gold nanoparticles but completely block 5 nm gold nanoparticles.

Given the nanostrand sheet as thick as 200 nm, there is a block rate of 15% achieved for cytochrome C of 2.5 nm in diameter, and a block rate of 70% achieved for myoglobin of 3.5 nm in diameter.

From this, it has been found that the nanostrand sheet can be used as a membrane filter that is capable of blocking structures of greater than 3 nm, preferably greater than 5 nm and allows for permeation of structures below those.

Then, the inventors has made studies of whether or not a filter cake is formed taking advantage of the ability of the nanostrand sheet to block structures of greater than 3 nm.

As a consequence, it has now been found that, as shown in Example 2, it is possible to form an ultrathin polymer porous membrane (hereinafter called the filter cake) which cannot block β-cyclodextrin (a cyclic oligomer of sugar having a diameter of 1.5 nm) yet can block a polymer obtained by crosslinking of it with epichlorohydrin, and which is free from an oligomer (non-crosslinked cyclodextrin) and crosslinking agents.

For cyclodextrin, it has been known that there is an at least 3 nm-sized structure formed by ring-opening and crosslinking of multiple epichlorohydrins (Non-Patent Publication 5).

Likewise, it has been found that it is possible to form an ultrathin polymer filter cake which cannot block polyethylene-imine yet can block polyethylene-imine crosslinked with glutaraldehyde.

It has turned out that if the inventive nanostrand membrane filter is used for the fabrication of a polymer membrane filter, it is then possible to form an ultrathin crosslinked polymer membrane filter.

In addition, it was possible to laminate or stack a filter cake made up of polyethylene-imine crosslinked with glutaraldehyde on a filter cake made up of cyclodextrin crosslinked with epichlorohydrin.

These filter cakes have a filter cake feature by themselves; they took hold of a self-standing feature capable of keeping membrane configuration even after the nanostrand sheet was washed with an acid for removal of nanostrands.

To add up to this, it has been found that the free-standing membrane of the filter cake can be used as an ultrafilter membrane allowing for fast filtration of dye molecules.

The invention reveals that if nanoparticles or suitable-sized oligomers or polymers are configured into a network structure or the like, it is then possible to fabricate an ultrathin filter cake by filtration through the nanostrand sheet, thereby obtaining a separation membrane.

From Examples 1 to 8, it can easily be understood that if organic molecules (inclusive of suitable-sized oligomers or polymers) are properly selected or used in combination with appropriate crosslinking agents, filter cakes made up of other polymers can be formed, and it could readily be inferred that high-speed yet reliable polymer filter cakes can be formed by choice of what is filtrated and filtration conditions.

With proper raw materials, membrane filters capable of fast permeation of gases or liquids could be fabricated, and there is great possibility that the invention may be applied as an alternative for the process for fabricating membrane filters by interface polycondensation, or phase transition of polymer solutions.

This implies that membrane filters made up of polymers obtained by the nanostrand membrane filter result in the ability to form ultrathin membrane filters allowing for fast separation, as is the case with the nanostrand membrane filters.

According to the teachings of Example 1, the nano-strand sheet of cadmium hydroxide is capable of filtration of nanoparticles or proteins (hereinafter called the nanoparticles or the like).

In addition to the nanostrands of cadmium hydroxide, those of copper or zinc hydroxide are known too, and the use of even those nanostrands could make it possible to obtain nanostrands similar to those of Example 1.

Referring here to the nanostrands of these metal hydroxides all having a lot of positive charges on their surfaces, it is known that they are formed by adding an alkali to an aqueous solution of the corresponding metal salt, with a width as thin as 2.5 nm or less (Non-Patent Publications 6 and 7).

For this reason, if they are filtrated through a porous substrate, then it provides a nanostrand sheet capable of filtration of the nanoparticles or the like.

The materials capable of forming the filter cake using the nanostrand sheet are not limited to such polymers as used in Examples 1 to 8; only the requirement for them is that they have a size or structure enough to be blocked by the nanostrand sheet, irrespective of their types.

For instance, there is the mention of nanoparticles of metals or oxides, nanoparticles of polymers, polymers having branched structures, crosslinked oligomers, and crosslinked polymers.

By way of example but not by way of limitation, the polymers having branched structures include dendrimer and amylose; the crosslinked oligomers include cyclodextrin crosslinked with epichlorohydrin; and the crosslinked polymers include polyethylene-imine crosslinked with glutaraldehyde.

The materials forming the filter cake must have a width enough to be blocked by the pores in the nano-strand sheet in the filtration process; for instance, when it comes to a straight-chain polymer, that polymer must essentially be crosslinked if its width is 3 nm or less.

As shown in Examples 4 and 6, some of the filter cakes formed using the nanostrand sheet provide a free-standing membrane by themselves, yet if they are treated thermally or with a crosslinking agent, that free-standing membrane could then pick up additional robustness.

So far, membranes have been downscaled in terms of thickness by choice of such a raw material (such as proteins) as forming a composite material with the nanostrands; however, the invention would lead to the possibility that less costly polymer materials (such as oligomers of polyethylene-imine, oligomers of water-soluble phenol resins, and oligomers of polyamide) may be formed by filtration into a thin membrane form.

The separation rate for dyes of the filter cake of polyethylene-imine crosslinked with glutaraldehyde was a stunning high. Some time may be taken for clarification of the detailed mechanism, but the fact that a flux exceeding 3,000 L/hm² is obtained at a thickness of 600 nm is an extraordinary result that would break new ground in a wide range of applications by adjustment of the crosslinking density, etc.

APPLICABILITY TO THE INDUSTRY

The inventive process for fabricating membrane filters, and the inventive membrane filter may be applied to the membrane filter fabrication industry, the industry where the separation of the nanoparticles or the like is carried out, and so on, because it is possible to form, with ease, membrane filters capable of efficient separation of nanoparticles, proteins, dye molecules or the like. Especially, the inventive membrane filters would hold great promise as a high-performance ultrafilter membrane, a water disposal membrane in the medical field, or a membrane for separation of proteins or medications. In addition, the inventive membrane filters may be used as membranes for air clearing and solid-liquid separation, and may be utilized as gas separation membranes or membranes for foods production as well.

EXPLANATION OF THE REFERENCE NUMERALS

2: Porous Substrate
3: Nanostrand Sheet
3a: One Surface
3b: Another Surface
3c: First Pore
3d: Nanostrands
20, 21, 22, 23: Membrane Filters
31: Beaker
32: Nanostrand Solution
33: Suction Bin
34: Funnel
35: Solution Containing Organic Molecules
36: Acid Solution
38: Solution Containing Separate Organic Molecules
41: Filter Cake
41a: One Surface
41b: Another Surface
41c: Second Pore
42: Filter Cake
42c: Third Pore

What is claimed is:

1. A process for fabricating membrane filters, comprising:
mixing an aqueous solution containing a metal salt and an aqueous solution containing an alkali to prepare a nanostrand solution comprising a metal hydroxide,
filtrating the nanostrand solution through a porous substrate to make an accumulation of fibrous nanostrands on the porous substrate thereby fabricating a nanostrand sheet, and
filtering a solution containing organic molecules through the nanostrand sheet to form a filter cake comprising an accumulation of the organic molecules on the nanostrand sheet, the organic molecules being cross-linkable oligomers or cross-linkable polymers,
wherein a maximum diameter of a first pore formed by way of gaps between the nanostrands and extending through the nanostrand sheet from one surface side to another surface side is greater than or equal to 3 nm and smaller than or equal to 5 nm, and
wherein a maximum diameter of a second pore formed through the filter cake and extending through the filter cake from one surface side to another surface side is greater than or equal to 0.5 nm and smaller than or equal to 5 nm.

2. A process for fabricating membrane filters according to claim 1, wherein the metal hydroxide is any one of $Cd(OH)_2$, $Cu(OH)_2$ or $Zn(OH)_2$.

3. A process for fabricating membrane filters according to claim 1, wherein pores in the porous substrate have a maximum diameter of up to 1.0 μm and a lower limit of 0.2 μm.

4. A process for fabricating membrane filters according to claim 1, wherein a solution containing organic molecules separate from the organic molecules forming the filter cake is filtrated through the nano-strand sheet having the filter cake formed thereon to form a separate filter cake comprising an accumulation of the separate organic molecules on the filter cake.

5. A process for fabricating membrane filters according to claim 1, wherein the organic molecule is any one of β-cyclodextrin, polyethylene-imine or poly(4-vinylpyridine).

6. A process for fabricating membrane filters according to claim 1, wherein the filter cake is formed and then subjected to crosslinking treatment.

7. A membrane filter, comprising:
a nanostrand sheet made up of an accumulation of nanostrands formed of a fibrous metal hydroxide and a filter cake comprising an accumulation of organic molecules being cross-linkable oligomers or cross-linkable polymers formed on one surface side of the nanostrand sheet,
wherein a first pore formed through the nanostrand sheet, occurred by way of gaps between the nanostrands and extending through the nanostrand sheet from the one surface side to another surface side has a maximum diameter of greater than or equal to 3 nm and smaller than or equal to 5 nm, and
wherein a second pore formed through the filter cake and extending through the filter cake from one surface side to another surface side has a maximum diameter of greater than or equal to 0.5 nm and smaller than or equal to 5 nm.

8. A membrane filter according to claim 7, wherein the metal hydroxide is any one of $Cd(OH)_2$, $Cu(OH)_2$ or $Zn(OH)_2$.

9. A membrane filter according to claim 7, wherein the nanostrands have a maximum diameter of greater than or equal to 1.9 nm and smaller than or equal to 2.5 nm.

10. A membrane filter according to claim 7, wherein the nanostrand sheet has a thickness of greater than or equal to 20 nm and smaller than or equal to 200 nm.

11. A membrane filter according to claim 7, wherein two or more filter cakes are provided in a laminated structure configuration.

12. A membrane filer according to claim 7, wherein the filter cake comprising an accumulation of the organic molecules is provided thereon with a separate filter cake comprising an accumulation of separate organic molecules.

13. A membrane filter according to claim 7, wherein at least one of two sets of the organic molecules is any one of β-cyclodextrin, polyethylene-imine or poly(4-vinylpyridine) that may or may not be crosslinked.

14. A membrane filter according to claim 13, wherein either one of the filter cakes is β-cyclodextrin crosslinked with epichlorohydrin.

15. A membrane filter according to claim 13, wherein either one of the filter cakes is polyethylene-imine crosslinked with glutaraldehyde.

16. A membrane filter according to claim 13, wherein either one of the filter cakes is poly(4-vinylpyridine) crosslinked with dibromopropane.

17. A membrane filter according to claim 7, wherein a porous substrate having a pore having a maximum diameter of up to 1.0 μm and a lower limit of 0.2 μm is laminated on the another surface side of the nanostrand sheet.

* * * * *